United States Patent
Sambonsugi

(10) Patent No.: US 11,272,130 B2
(45) Date of Patent: Mar. 8, 2022

(54) IMAGE CAPTURING APPARATUS

(71) Applicant: CANON KABUSHIKI KAISHA, Tokyo (JP)

(72) Inventor: Hideaki Sambonsugi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/831,588

(22) Filed: Mar. 26, 2020

(65) Prior Publication Data

US 2020/0260041 A1 Aug. 13, 2020

Related U.S. Application Data

(63) Continuation of application No. PCT/JP2018/034444, filed on Sep. 18, 2018.

(30) Foreign Application Priority Data

Sep. 29, 2017 (JP) .............................. JP2017-191757

(51) Int. Cl.
| | |
|---|---|
| *H04N 5/374* | (2011.01) |
| *H04N 5/378* | (2011.01) |
| *H04N 5/232* | (2006.01) |
| *H04N 5/369* | (2011.01) |
| *H04N 5/343* | (2011.01) |
| *H01L 27/146* | (2006.01) |

(Continued)

(52) U.S. Cl.
CPC .............................. *H04N 5/3745* (2013.01)

(58) Field of Classification Search
CPC ...... H04N 5/3745; H04N 5/379; H04N 5/232; H04N 5/232411; H04N 5/343; H04N 5/369; H04N 5/378; H01L 27/14634; H01L 27/14632; H01L 27/1469; H01L 27/14643; H01L 29/788

USPC .......... 348/302, 301, 308, 294, 345, 208.12, 348/326, 285; 257/291, 292, 443, 447, 257/777, 778; 250/208.1, 201.2, 201.4, 250/231.16; 396/79, 80, 121

See application file for complete search history.

(56) References Cited

U.S. PATENT DOCUMENTS

| | | | |
|---|---|---|---|
| 9,374,541 B2 * | 6/2016 | Nishihara | ............ H04N 5/3537 |
| 10,075,660 B2 * | 9/2018 | Nishihara | ................ H04N 3/14 |
| 10,368,023 B2 * | 7/2019 | Hwang | .................. H04N 5/378 |

(Continued)

FOREIGN PATENT DOCUMENTS

| | | |
|---|---|---|
| CN | 101228631 A | 7/2008 |
| CN | 101455070 A | 6/2009 |

(Continued)

*Primary Examiner* — Marly S Camargo
(74) *Attorney, Agent, or Firm* — Canon U.S.A., Inc. IP Division

(57) ABSTRACT

An apparatus includes an image sensor including a first substrate and a second substrate that are stacked one on top of another, the first substrate having a pixel array in which pixel blocks each including a plurality of pixels for performing photoelectric conversion are disposed in matrix, the second substrate having a circuit array in which a plurality of signal processing units that process signals based on the photoelectric conversion are disposed in matrix; obtaining means for obtaining an image signal from the image sensor; and driving control means for controlling driving for obtaining the image signal from the image sensor.

45 Claims, 27 Drawing Sheets

(51) Int. Cl.
 *H01L 29/788* (2006.01)
 *H04N 5/3745* (2011.01)

(56) References Cited

U.S. PATENT DOCUMENTS

| | | | |
|---|---|---|---|
| 2012/0013778 A1 | 1/2012 | Sonoda | |
| 2014/0063308 A1 | 3/2014 | Saito | |
| 2014/0175592 A1* | 6/2014 | Iwabuchi | H01L 27/14634 |
| 2015/0256774 A1 | 9/2015 | Nishihara | |
| 2016/0044238 A1* | 2/2016 | Takada | H04N 5/23229 |
| 2016/0269657 A1* | 9/2016 | Nishihara | H04N 5/353 |
| 2017/0163920 A1* | 6/2017 | Hwang | H04N 5/378 |
| 2020/0014872 A1* | 1/2020 | Kawazu | H04N 5/378 |
| 2020/0228743 A1* | 7/2020 | Uchida | H04N 5/3745 |
| 2020/0358975 A1* | 11/2020 | Hagihara | H04N 5/378 |
| 2020/0366860 A1* | 11/2020 | Shishido | H04N 5/374 |
| 2021/0152768 A1* | 5/2021 | Kawazu | H04N 5/378 |
| 2021/0183925 A1* | 6/2021 | Shukuri | H01L 27/146 |
| 2021/0227162 A1* | 7/2021 | Nonoshita | H04N 5/378 |
| 2021/0306586 A1* | 9/2021 | Yamamoto | H04N 5/378 |
| 2021/0314513 A1* | 10/2021 | Ishii | H04N 5/378 |

FOREIGN PATENT DOCUMENTS

| | | |
|---|---|---|
| CN | 101753865 A | 6/2010 |
| CN | 102447846 A | 5/2012 |
| CN | 104429057 A | 3/2015 |
| CN | 104869290 A | 8/2015 |
| CN | 105763819 A | 7/2016 |
| JP | 2001-124984 A | 5/2001 |
| JP | 2012-120159 A | 6/2012 |
| JP | 2014-138364 A | 7/2014 |
| JP | 2014138364 A | 7/2014 |
| JP | 2014-195112 A | 10/2014 |
| JP | 2016-40905 A | 3/2016 |
| JP | 2016-184843 A | 10/2016 |
| KR | 2009-0083817 A | 8/2009 |
| KR | 2016-0084299 A | 7/2016 |
| KR | 2017-0089535 A | 8/2017 |

* cited by examiner

FIG. 3

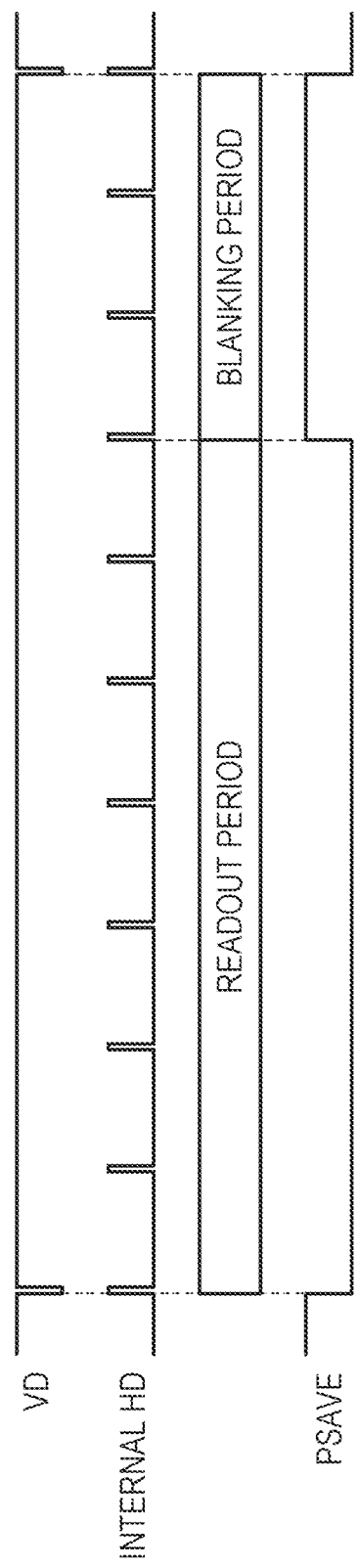

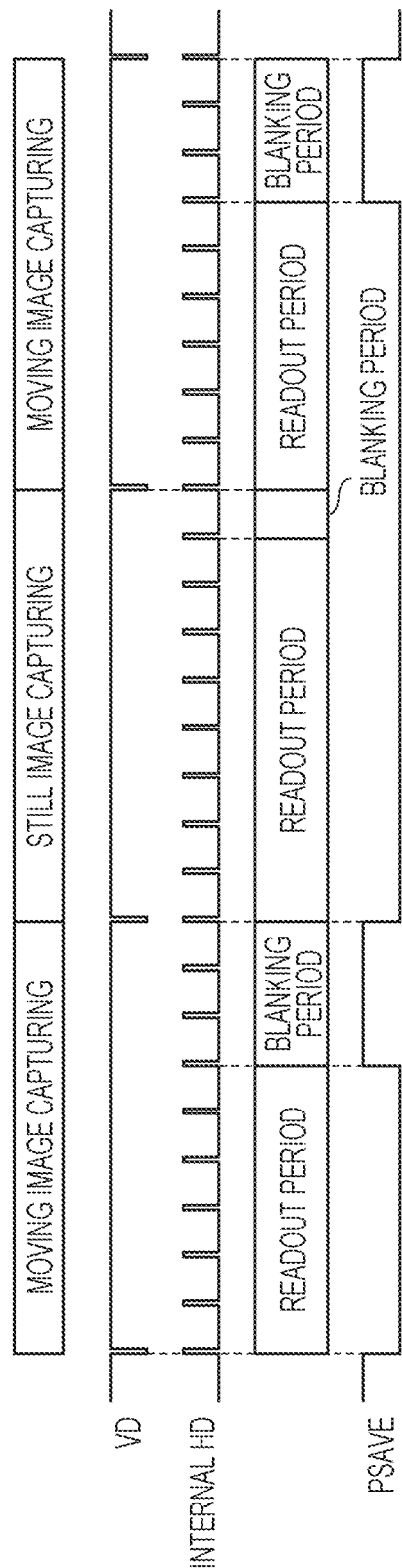

☐ NORMAL OPERATION
▨ POWER SAVING OPERATION

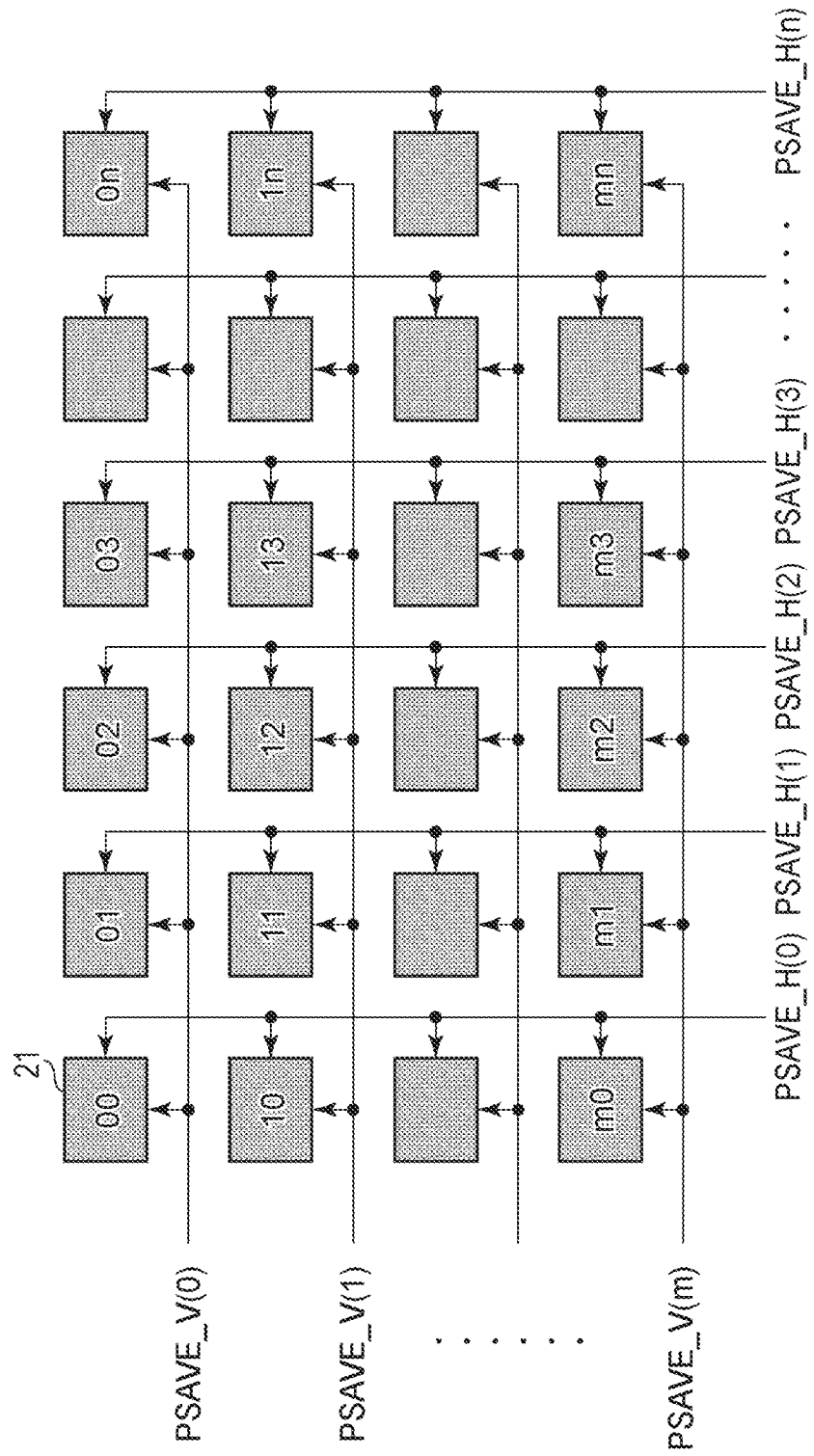

FIG. 24A

|   | 0 | 1 | 2 | 3 | | | | | | | | | | n |
|---|---|---|---|---|---|---|---|---|---|---|---|---|---|---|
| 0 | H0 V0 | H1 V0 | H2 V0 | H3 V0 | | | | | | | | | | |
| 1 | | | | | | | | | | | | | | |
| 2 | H0 V1 | H1 V1 | H2 V1 | H3 V1 | | | | | | | | | | |
| 3 | | | | | | | | | | | | | | |
| 4 | H0 V2 | H1 V2 | H2 V2 | H3 V2 | | | | | | | | | | |
| 5 | | | | | | | | | | | | | | |
| m | | | | | | | | | | | | | | |

FIG. 24B

|   | 0 | 1 | 2 | 3 | | | | | | | | | | n |
|---|---|---|---|---|---|---|---|---|---|---|---|---|---|---|
| 0 | P00 Q00 | P01 Q01 | P02 Q02 | P03 Q03 | | | | | | | | | | |
| 1 | | | | | | | | | | | | | | |
| 2 | P10 Q10 | P11 Q11 | P12 Q12 | P13 Q13 | | | | | | | | | | |
| 3 | | | | | | | | | | | | | | |
| 4 | P20 Q20 | P21 Q21 | P22 Q22 | P23 Q23 | | | | | | | | | | |
| 5 | | | | | | | | | | | | | | |
| m | | | | | | | | | | | | | | |

IMAGE CAPTURING APPARATUS

CROSS-REFERENCE TO RELATED APPLICATIONS

This application is a Continuation of International Patent Application No. PCT/JP2018/034444, filed Sep. 18, 2018, which claims the benefit of Japanese Patent Application No. 2017-191757, filed Sep. 29, 2017, both of which are hereby incorporated by reference herein in their entirety.

TECHNICAL FIELD

The present invention relates to an image capturing apparatus.

BACKGROUND ART

In recent years, image capturing apparatuses including an image sensor, such as a CMOS sensor, have become more multifunctional. For example, PTL 1 discloses an image capturing apparatus configured to be capable of performing pupil division focus detection by using signals obtained from an image sensor, as well as generating a captured image such as a still image or moving image. In the configuration described in PTL 1, an increase in the amount of data causes a longer readout time, resulting in a lower frame rate and increased power consumption. PTL 2 discloses control for switching between an operation state and a standby state in accordance with a result of computation by a computing unit for each pixel block to save power of an analog-to-digital conversion circuit (hereinafter referred to as an ADC circuit) in an image sensor.

CITATION LIST

Patent Literature

PTL 1: Japanese Patent Laid-Open No. 2001-124984
PTL 2: Japanese Patent Laid-Open No. 2016-184843

However, individual pixels in PTL 2 are based on the assumption of having a conventional configuration of obtaining a captured image, and it is not clear how pixel blocks are configured. Furthermore, it is not clear how the pixel blocks are configured and controlled in the case of a pixel configuration capable of performing focus detection in addition to generating a captured image as in PTL 1, and there is a possibility that power consumption may increase.

An object of the present invention is to provide an image capturing apparatus that is capable of realizing power saving of the image sensor while suppressing a decrease in frame rate caused by an increase in the amount of data.

SUMMARY OF INVENTION

An image capturing apparatus according to the present invention includes an image sensor including a first substrate and a second substrate that are stacked one on top of another, the first substrate having a pixel array in which pixel blocks each including a plurality of pixels for performing photoelectric conversion are disposed in matrix, the second substrate having a circuit array in which a plurality of signal processing units that process signals based on the photoelectric conversion are disposed in matrix; obtaining means for obtaining an image signal from the image sensor; and driving control means for controlling driving for obtaining the image signal from the image sensor. Each of the signal processing units includes a conversion circuit that performs analog-to-digital conversion on the signals input from a corresponding one of the pixel blocks through a plurality of signal lines during an identical period. The driving control means controls a power saving operation of at least one or some of the signal processing units during a period over which analog-to-digital conversion is not performed in the signal processing units.

Further features of the present invention will become apparent from the following description of exemplary embodiments with reference to the attached drawings.

BRIEF DESCRIPTION OF DRAWINGS

FIG. 3 is a plan view illustrating an example of pixel arrangement of the image sensor in the image capturing apparatus according to the first embodiment of the present invention.

FIG. 16 is a timing chart illustrating a readout operation of an image sensor in an image capturing apparatus according to a fourth embodiment of the present invention.

FIG. 17 is a timing chart illustrating a readout operation of the image sensor in the image capturing apparatus according to the fourth embodiment of the present invention.

FIG. 20 is a schematic diagram illustrating an example of wiring lines of the image sensor in the image capturing apparatus according to the fifth embodiment of the present invention.

FIG. 24A is a schematic diagram illustrating an example of the configuration of an image sensor in an image capturing apparatus according to the seventh embodiment of the present invention.

FIG. 24B is a schematic diagram illustrating an example of the configuration of the image sensor in the image capturing apparatus according to the seventh embodiment of the present invention.

DESCRIPTION OF EMBODIMENTS

First Embodiment

An image sensor and an image capturing apparatus according to a first embodiment of the present invention will be described with reference to individual figures. At that time, those having the same function will be denoted by the same numerals in all the figures, and repeated description thereof will be omitted.

First, a schematic configuration of an image capturing apparatus 100 according to this embodiment will be described with reference to FIG. 1.

Figure 1:
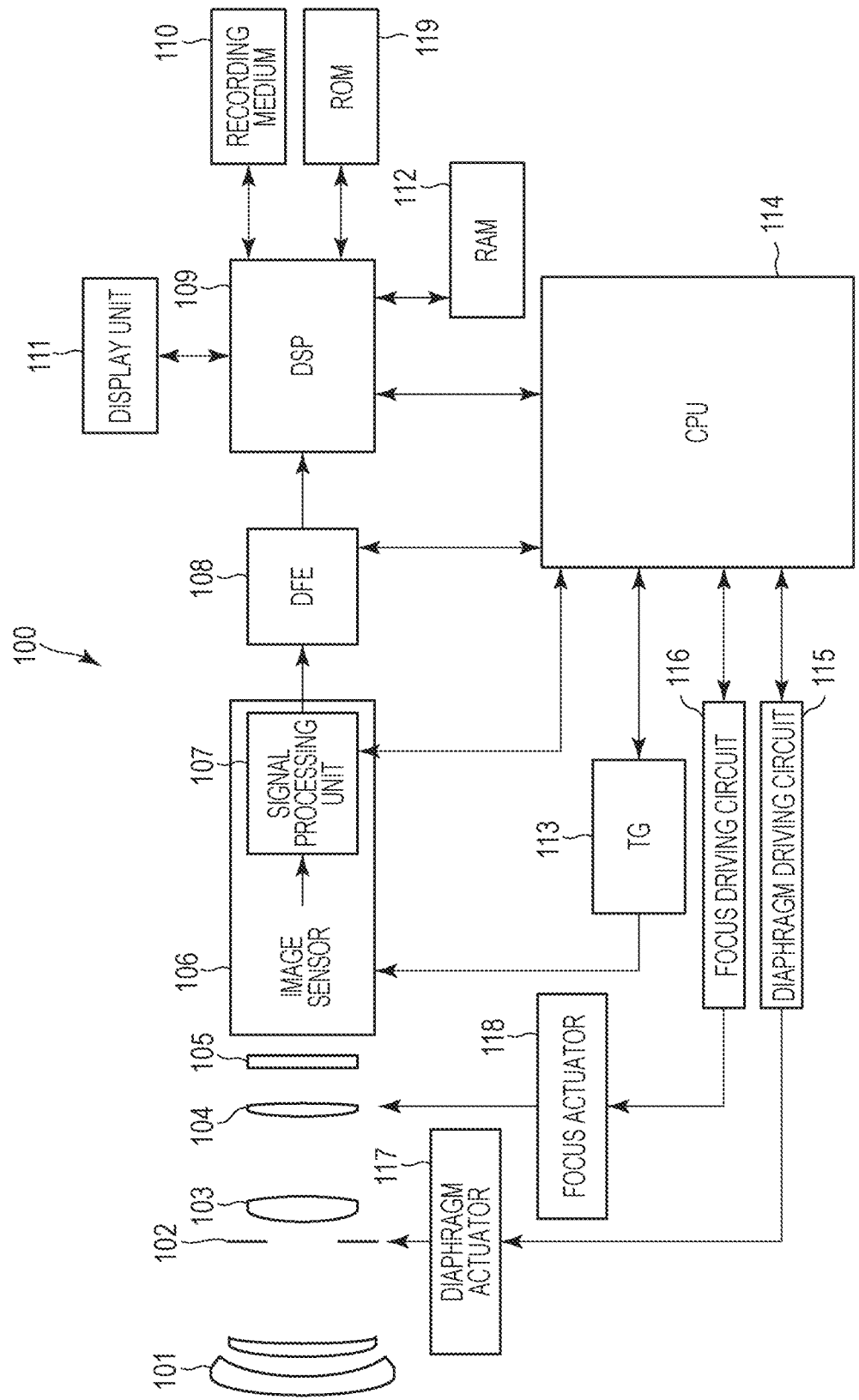
FIG. 1 is a block diagram illustrating a schematic configuration of an image capturing apparatus according to a first embodiment of the present invention.

As illustrated in FIG. 1, the image capturing apparatus 100 according to this embodiment includes a first lens group 101, a diaphragm 102, a second lens group 103, a third lens group 104, an optical low-pass filter 105, and an image sensor 106. The image capturing apparatus 100 also includes a diaphragm actuator 117, a focus actuator 118, a diaphragm driving circuit 115, and a focus driving circuit 116. The image sensor 106 includes a signal processing unit 107. The image capturing apparatus 100 further includes a digital front end (DFE) 108 and a digital signal processor (DSP) 109. The image capturing apparatus 100 also includes a display unit 111, a RAM 112, a timing generation circuit (TG) 113, a CPU 114, a ROM 119, and a recording medium 110.

The first lens group 101, the diaphragm 102, the second lens group 103, the third lens group 104, and the optical low-pass filter 105 are disposed in this order from a subject side along an optical axis, and these components constitute an image capturing optical system. The image capturing optical system corresponds to an optical system for forming an optical image of a subject. The first lens group 101 is a lens group disposed at the foremost portion (subject side) of the image capturing optical system and is held so as to be movable back and forth in an optical-axis direction. The diaphragm 102 has a function of adjusting the amount of light during image capturing when the opening diameter thereof is adjusted. The second lens group 103 moves back or forth in the optical-axis direction in conjunction with the diaphragm 102, and performs a magnification change operation (zoom function) in conjunction with a back or forth movement of the first lens group 101. The third lens group 104 has a function of adjusting focus by moving back or forth in the optical-axis direction. The optical low-pass filter 105 is an optical element for reducing color noise or moire of a captured image.

In this embodiment, an example is given in which a lens apparatus including the image capturing optical system is integrated with the main body of the image capturing apparatus 100, but an embodiment of the present invention is not limited thereto. The present invention is also applicable to an image capturing system constituted by a main body of an image capturing apparatus and a lens apparatus (image capturing optical system) that is removably attached to the main body of the image capturing apparatus.

The diaphragm actuator 117 includes a mechanism for changing the opening diameter of the diaphragm 102. The diaphragm driving circuit 115 is a driving circuit for controlling the opening diameter of the diaphragm 102 by using the diaphragm actuator 117 to adjust the amount of light for image capturing and for controlling an exposure time during still image capturing. The focus actuator 118 includes a mechanism for driving the third lens group 104 back and forth in the optical-axis direction. The focus driving circuit 116 is a driving circuit for driving the focus actuator 118 to adjust a focus position.

Figure 2:
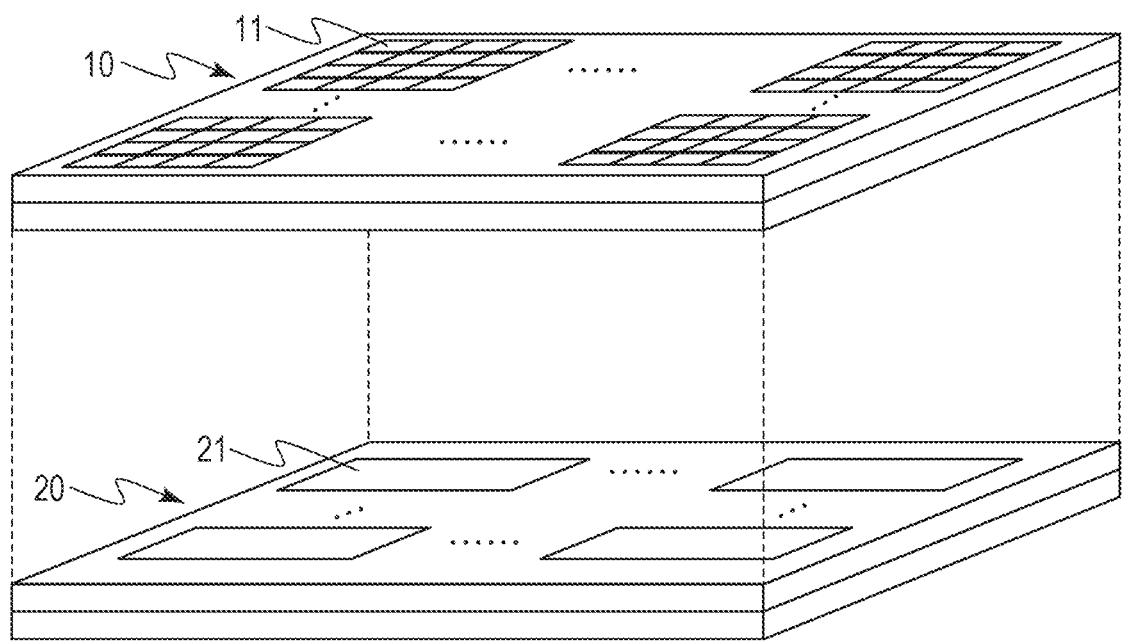
FIG. 2 is a block diagram illustrating a schematic configuration of an image sensor according to the first embodiment of the present invention.

The image sensor 106 is a two-dimensional CMOS image sensor disposed on an image formation surface of the image capturing optical system. The image sensor 106 according to this embodiment is, unlike an ordinary image sensor, a multilayer image sensor having a multilayer structure as illustrated in FIG. 2. More specifically, the image sensor 106 has a multilayer structure in which a first substrate 10 and a second substrate 20 are stacked one on top of another. The first substrate 10 includes pixel portions 11 that perform photoelectric conversion on incident light. The second substrate 20 includes signal processing units 21 that process signals from the pixel portions 11, and peripheral circuits or the like. The pixel portions 11 and the signal processing units 21 are periodically arranged in a row direction and a column direction within the respective substrates. Although two substrates are stacked in this embodiment, more substrates may be stacked. For example, stacking of a substrate including a memory such as a DRAM or a substrate including a different signal processing circuit enables the image sensor 106 to have a new function. The peripheral circuits included in the second substrate 20 in this embodiment include a power supply circuit, a timing generation circuit, a register, an output amplifier, and the like.

The image sensor 106 converts a subject image (optical image) formed by the image capturing optical system into an electric signal by photoelectric conversion. In this specification, the image sensor 106 may be referred to as an image capturing unit. The TG 113 supplies, to the image sensor 106 or the like, a driving signal for driving the image sensor 106 or the like at a predetermined timing. A driving signal includes a clock signal and a synchronization signal for operating the image sensor 106, and further includes various setting parameters or the like for changing modes to select driving of the image sensor 106. The TG 113 may be provided as an internal TG inside the image sensor 106 and may be configured to generate a driving signal on the basis of a synchronization signal supplied from the outside. The modes to select driving of the image sensor 106 include at least a still image mode, a moving image mode, and a live view mode.

The signal processing unit 107 is provided in the image sensor 106 and includes at least an ADC circuit that converts an analog image signal output from a pixel portion into a digital image signal.

The DFE 108 has a function of performing predetermined computation processing on a digital image signal output from the image sensor 106. The DSP 109 has a function of performing correction processing, development processing, and the like on a digital image signal output from the DFE 108. The DSP 109 also has a function of performing auto-focus (AF) computation for calculating the amount of deviation from a focal point by using an image signal (digital image signal). The DFE 108 and the DSP 109 include a reconfigurable circuit, such as an FPGA circuit. By forming various circuit configurations in accordance with external settings, a complicated correction operation and the like can be performed by using small circuit resources.

The display unit 111 has a function of displaying a captured image, various menu screens, and so forth. A liquid crystal display (LCD), an organic EL display (OELD), or the like is used as the display unit 111. The RAM 112 is a random access memory for temporarily storing data of a captured image or the like. The ROM 119 is a read only memory for storing various corrected data, a program for executing predetermined processing, and the like. The recording medium 110 is for recording data of a captured image. The recording medium 110 may be a removable medium, for example, a memory card using a nonvolatile semiconductor memory such as an SD memory card. The RAM 112, the ROM 119, and the recording medium 110 are connected to the DSP 109.

The CPU 114 is a control device that controls the entire image capturing apparatus 100 and centrally controls individual components. In addition, the CPU 114 sets various setting parameters or the like to the individual components. The CPU 114 includes a cache memory or the like on which data can be electrically written and from which data can be electrically erased, and executes a program recorded thereon. The memory is used as a region for storing a program executed by the CPU, a work region while a program is being executed, a region for storing data, or the like. In addition, the CPU 114 analyzes a signal output from the image sensor 106 and performs image processing. A result of analysis is output as image information. The image information is an image analysis result and includes not only the brightness and color of a subject but also the presence/absence and characteristics of an object (including a human body), the position/speed/acceleration of the object, a detection result of a specific subject, and so forth. In addition, the CPU 114 controls the focus driving circuit 116 on the basis of an AF computation result output from the DSP 109, and adjusts a focus position of the image capturing optical system by using the focus actuator 118.

Next, an example of the pixel arrangement of the image sensor 106 in the image capturing apparatus 100 according to this embodiment will be described with reference to FIG. 3. The pixel arrangement illustrated in FIG. 3 corresponds to the arrangement of the pixel portions 11 included in the first substrate 10.

Figure 3:
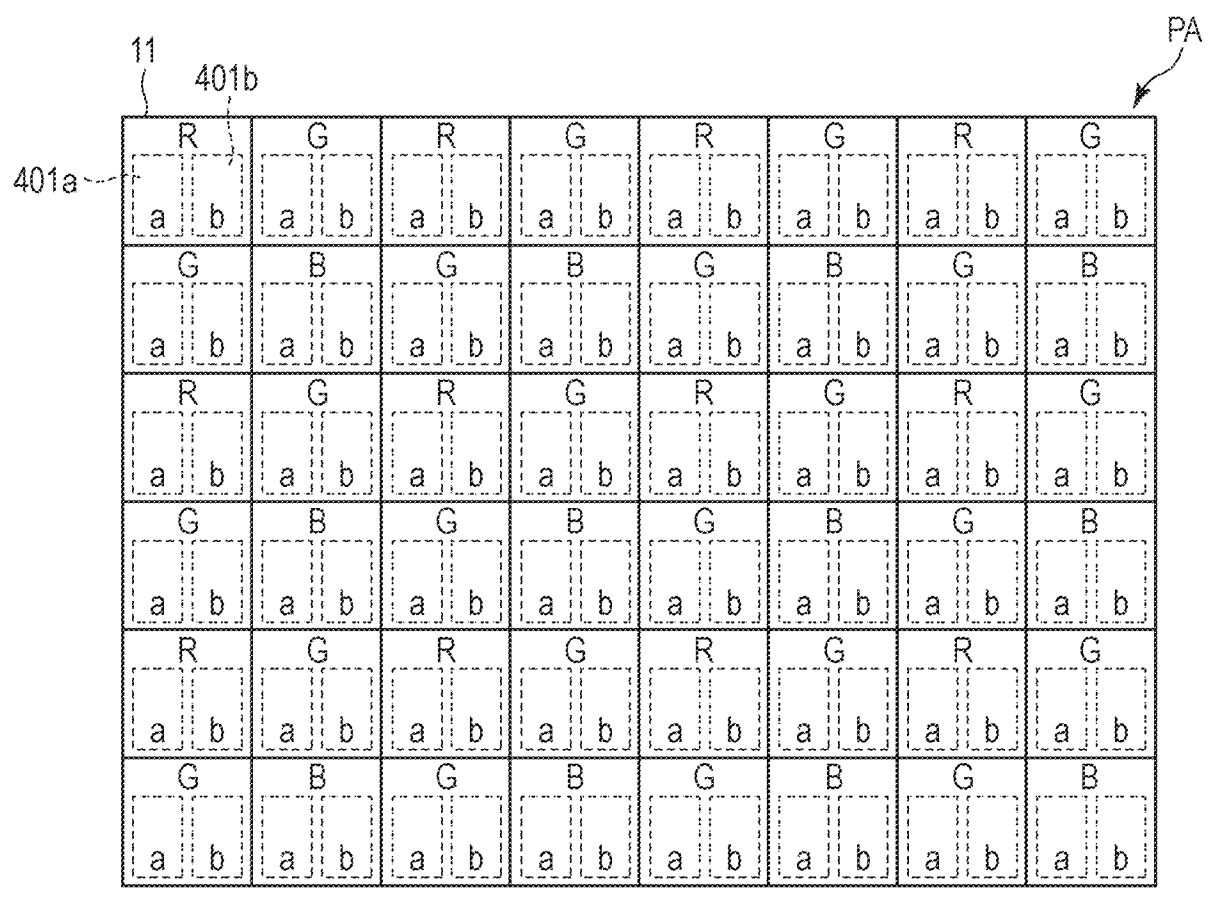

The image sensor 106 has a pixel area PA (pixel array) in which a plurality of pixel portions 11 (unit pixels) are two-dimensionally arranged in array in the row direction and the column direction, as illustrated in FIG. 3, for example. The pixel area PA may include, although not particularly limited, a pixel array of the pixel portions 11 in 4000 rows×8000 columns, for example. FIG. 3 illustrates a pixel array of 6 rows×8 columns among them.

Each pixel portion 11 includes two photodiodes (hereinafter referred to as "PDs") 401a and 401b, one microlens (not illustrated), and a color filter (not illustrated). The PD 401a and the PD 401b are photoelectric conversion units of two sub-pixels a and b formed in the pixel portion 11, respectively. Each pixel portion 11 is provided with one microlens, which concentrates incident light onto the two photoelectric conversion units of the pixel portion 11.

Reference symbols a and b in each pixel portion 11 in FIG. 3 represent the sub-pixels a and b on the left and right as a result of pupil division. An output signal a (A signal) output from the sub-pixel a and an output signal b (B signal) output from the sub-pixel b are focus detection signals used for focus detection. A signal obtained by adding the A signal and the B signal (A+B signal) is used to generate an image (generate a captured image). Reference symbols R, G, and B represent the colors (spectral characteristics) of the color filters. R represents a red filter, G represents a green filter, and B represents a blue filter. The two PDs 401a and 401b constituting one pixel portion 11 have a color filter of the same color assigned thereto. FIG. 3 illustrates an example in which the color filters are disposed in a so-called Bayer array, but the disposition of the color filters is not limited thereto. In addition, a pupil division direction is not limited to the direction for dividing a pixel into left and right portions, and may be a direction for dividing a pixel into upper and lower portions or a direction for dividing a pixel into three or more portions.

Figure 4:
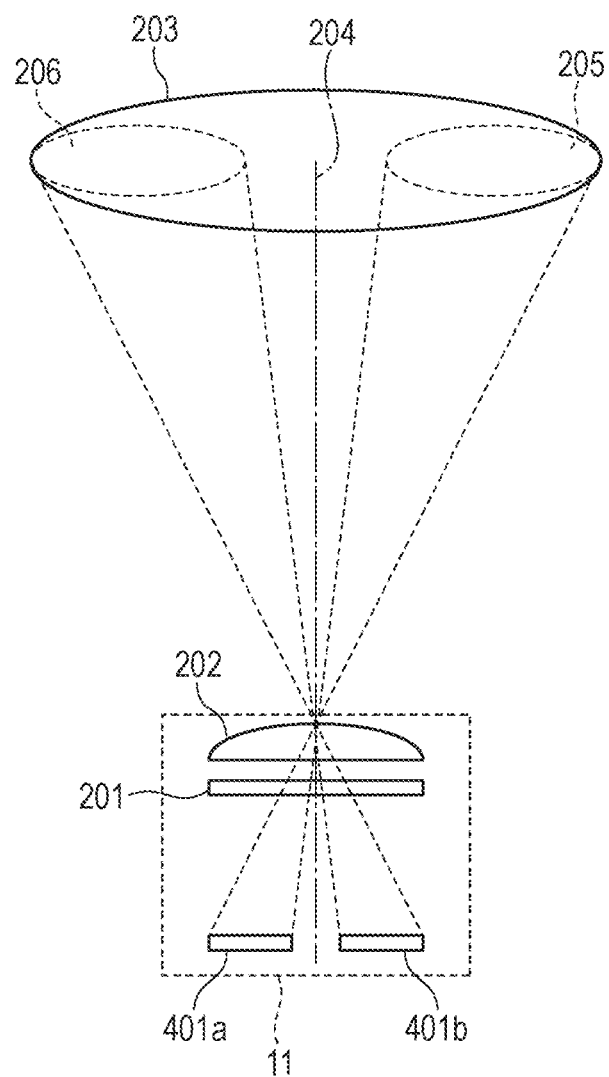
FIG. 4 is a schematic diagram illustrating a relationship between fluxes of light from an exit pupil of an image capturing optical system and a unit pixel.

Next, a relationship between fluxes of light from an exit pupil of the image capturing optical system (image capturing lens) and the pixel portion 11 of the image sensor 106 will be described with reference to FIG. 4. The pixel portion 11 includes the PDs 401a and 401b, and a color filter 201 and a microlens 202 disposed above the PDs 401a and 401b. Assume a case where fluxes of light passed through an exit pupil 203 of the image capturing optical system (image capturing lens) enter the pixel portion 11, with an optical axis 204 of the image capturing optical system being the center. Regarding the fluxes of light that pass through pupil regions (partial regions) 205 and 206 different from each other of the exit pupil 203 of the image capturing optical system (image capturing lens), the flux of light passed through the pupil region 205 is received by the PD 401a of the sub-pixel a through the microlens 202. On the other hand, the flux of light passed through the pupil region 206 is received by the PD 401b of the sub-pixel b through the microlens 202.

In this way, the sub-pixels a and b receive light rays passed through separate regions (regions different from each other) of the exit pupil 203 of the image capturing lens. Thus, as a result of comparing the A signal, which is an output signal of the sub-pixel a, and the B signal, which is an output signal of the sub-pixel b, focus detection using a phase difference can be performed.

Figure 5A:
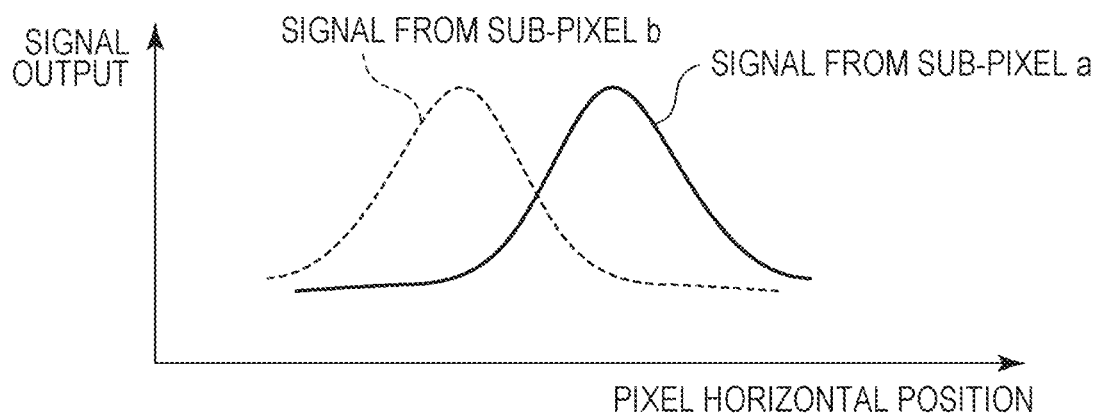
FIG. 5A is a graph illustrating an example of image signal waveforms obtained from two sub-pixels of the image sensor.
Figure 5B:
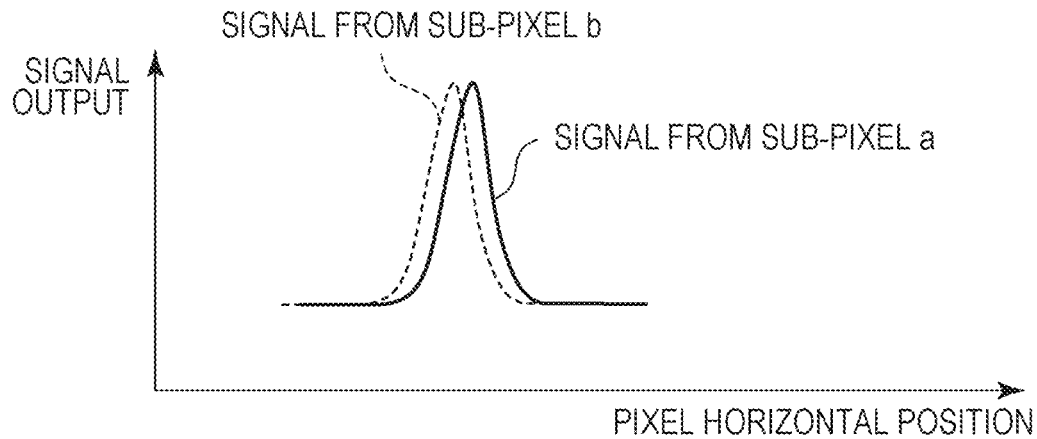
FIG. 5B is a graph illustrating an example of image signal waveforms obtained from two sub-pixels of the image sensor.

Next, image signal waveforms obtained from the sub-pixels a and b of the image sensor 106 will be described with reference to FIG. 5A and FIG. 5B. FIG. 5A is a graph illustrating an example of image signal waveforms obtained from the sub-pixels a and b in an out-of-focus state (defocused state). FIG. 5B is a graph illustrating an example of image signal waveforms obtained from the sub-pixels a and b in an in-focus state (substantially in-focus state). In FIG. 5A and FIG. 5B, the vertical axis represents signal output, and the horizontal axis represents position (pixel horizontal position).

In an out-of-focus state (in a defocused state), the image signal waveforms obtained from the sub-pixels a and b (A signal and B signal) do not match each other and are largely deviated from each other as illustrated in FIG. 5A. When the state changes from the out-of-focus state to be closer to an in-focus state, the deviation between the image signal waveforms of the sub-pixels a and b becomes smaller as illustrated in FIG. 5B. In an in-focus state, these image signal waveforms overlap each other. In this way, as a result of detecting a deviation (the amount of deviation) between the image signal waveforms obtained from the sub-pixels a and b, the amount of out-of-focus (the amount of defocusing) can be detected, and focus adjustment of the image capturing optical system can be performed by using information about the detection.

Next, an example configuration of the image sensor 106 in the image capturing apparatus 100 according to this embodiment will be described in detail.

Figure 6:
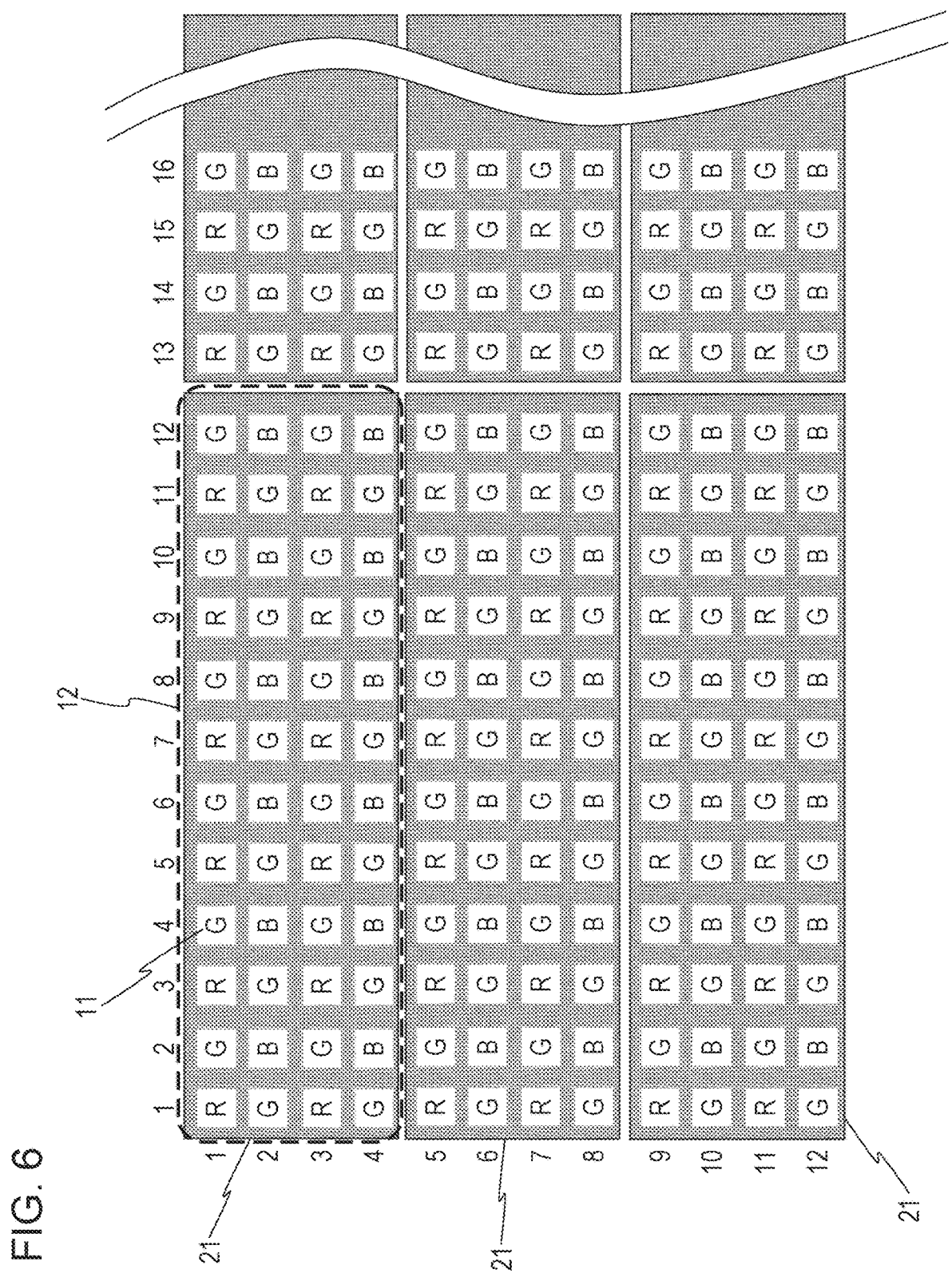
FIG. 6 is a schematic diagram illustrating an example of the configuration of the image sensor in the image capturing apparatus according to the first embodiment of the present invention.

The image sensor 106 has a multilayer structure in which the first substrate 10 including the pixel portions 11 and the second substrate 20 including the signal processing units 21 are stacked one on top of another, as illustrated in FIG. 2. FIG. 6 is a diagram illustrating a positional relationship on a plane between the disposition of the pixel portions 11 and the signal processing units 21. Each white square represents one pixel portion 11 provided in the first substrate 10, and a character attached thereto represents the color of the color filter provided to the pixel portion 11. Each gray rectangle disposed at the back surfaces of the pixel portions 11 represents one signal processing unit 21 provided in the second substrate 20.

As illustrated in FIG. 6, a plurality of pixel portions 11 and a plurality of signal processing units 21 are periodically arranged in the row direction and the column direction within the respective substrates to form a pixel array and a circuit array. The area of the pixel portions 11 in the first substrate 10 is smaller than the area of the signal processing units 21 in the second substrate 20. Thus, a predetermined number of pixel portions 11 surrounded by a broken line are regarded as a pixel block 12, and the signal processing units 21 are disposed corresponding to the pixel blocks 12 on a one-to-one basis. In this embodiment, the pixel portions 11 in 4 rows×12 columns are regarded as one pixel block 12. This is one example, and a different number of pixels or a different array may be regarded as one pixel block 12. In addition, the signal processing unit 21 corresponding to each pixel block 12 need not necessarily correspond to the pixel block 12 in terms of the position (for example, need not necessarily be positioned immediately under the pixel portions 11). The pixel portions 11 and the signal processing units 21 may be apart from each other.

Figure 7:
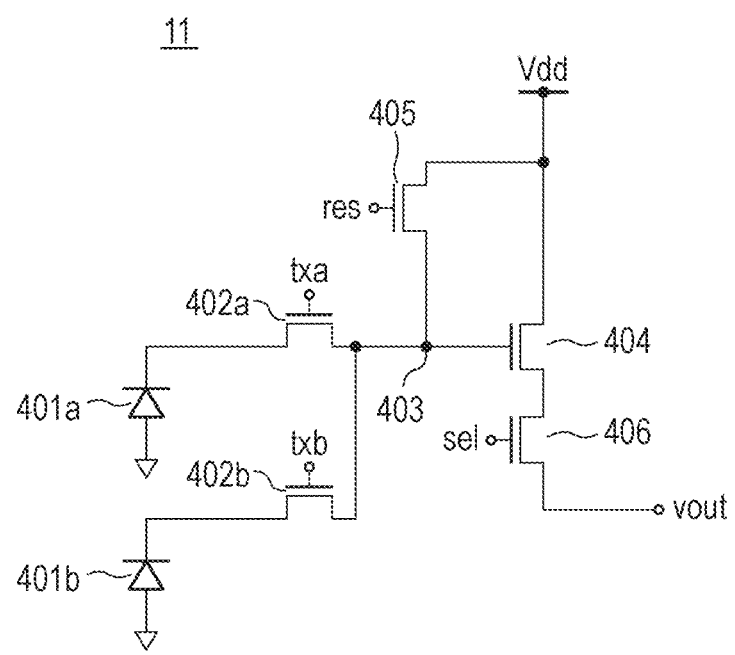
FIG. 7 is a diagram illustrating an example of the circuit configuration of a unit pixel of the image sensor in the image capturing apparatus according to the first embodiment of the present invention.

As illustrated in FIG. 7, each pixel portion 11 includes the PDs 401a and 401b, transfer transistors 402a and 402b, a reset transistor 405, an amplification transistor 404, and a selection transistor 406. The anode of the PD 401a is connected to a ground voltage line, and the cathode of the PD 401a is connected to the source of the transfer transistor 402a. The anode of the PD 401b is connected to the ground voltage line, and the cathode of the PD 401b is connected to the source of the transfer transistor 402b. The drain of the transfer transistor 402a and the drain of the transfer transistor 402b are connected to the source of the reset transistor 405 and the gate of the amplification transistor 404. A connection node of the drains of the transfer transistors 402a and 402b, the source of the reset transistor 405, and the gate of the amplification transistor 404 serves as a floating diffusion portion (hereinafter referred to as an "FD portion") 403. The drain of the reset transistor 405 and the drain of the amplification transistor 404 are connected to a power supply voltage line (voltage Vdd). The source of the amplification transistor 404 is connected to the drain of the selection transistor 406.

The PDs 401a and 401b of the sub-pixels a and b each perform photoelectric conversion on an optical signal (optical image) input thereto and store a charge corresponding to the amount of exposure. The transfer transistors 402a and 402b transfer the charges stored in the PDs 401a and 401b to the FD portion 403 in accordance with signals PTXA and PTXB at a high level, respectively. The FD portion 403 converts the charges transferred from the PDs 401a and 401b into a voltage corresponding to the amount of charge by the parasitic capacitance thereof, and applies the voltage to the gate of the amplification transistor 404. The reset transistor 405 is a switch circuit for resetting the FD portion 403 and resets the FD portion 403 in accordance with a signal PRES at a high level. In the case of resetting the charges of the PDs 401a and 401b, the signal PRES and the signals PTXA and PTXB are simultaneously set to a high level to turn ON the transfer transistors 402a and 402b and the reset transistor 405. Subsequently, the PDs 401a and 401b are reset via the FD portion 403. The selection transistor 406 outputs a pixel signal converted into a voltage by the amplification transistor 404 to an output node vout of the pixel portion 11 (pixel) in accordance with a signal PSEL at a high level.

On the extension of each row of the pixel array of the first substrate 10, a driving signal line that is not illustrated is disposed in the row direction. The driving signal line is connected to a vertical scanning circuit provided in the first substrate 10 or the second substrate 20. A predetermined driving signal for driving a pixel readout circuit of the pixel portions 11 is output from the vertical scanning circuit to the driving signal line at a predetermined timing. Specifically, each driving signal line includes a plurality of (for example, four) signal lines for supplying the above-described signal PTXA, signal PTXB, signal PRES, and signal PSEL to the plurality of pixel portions 11 arranged in the row direction. These signal lines form a signal line common to the plurality of pixel portions 11 belonging to the same row.

Figure 8:
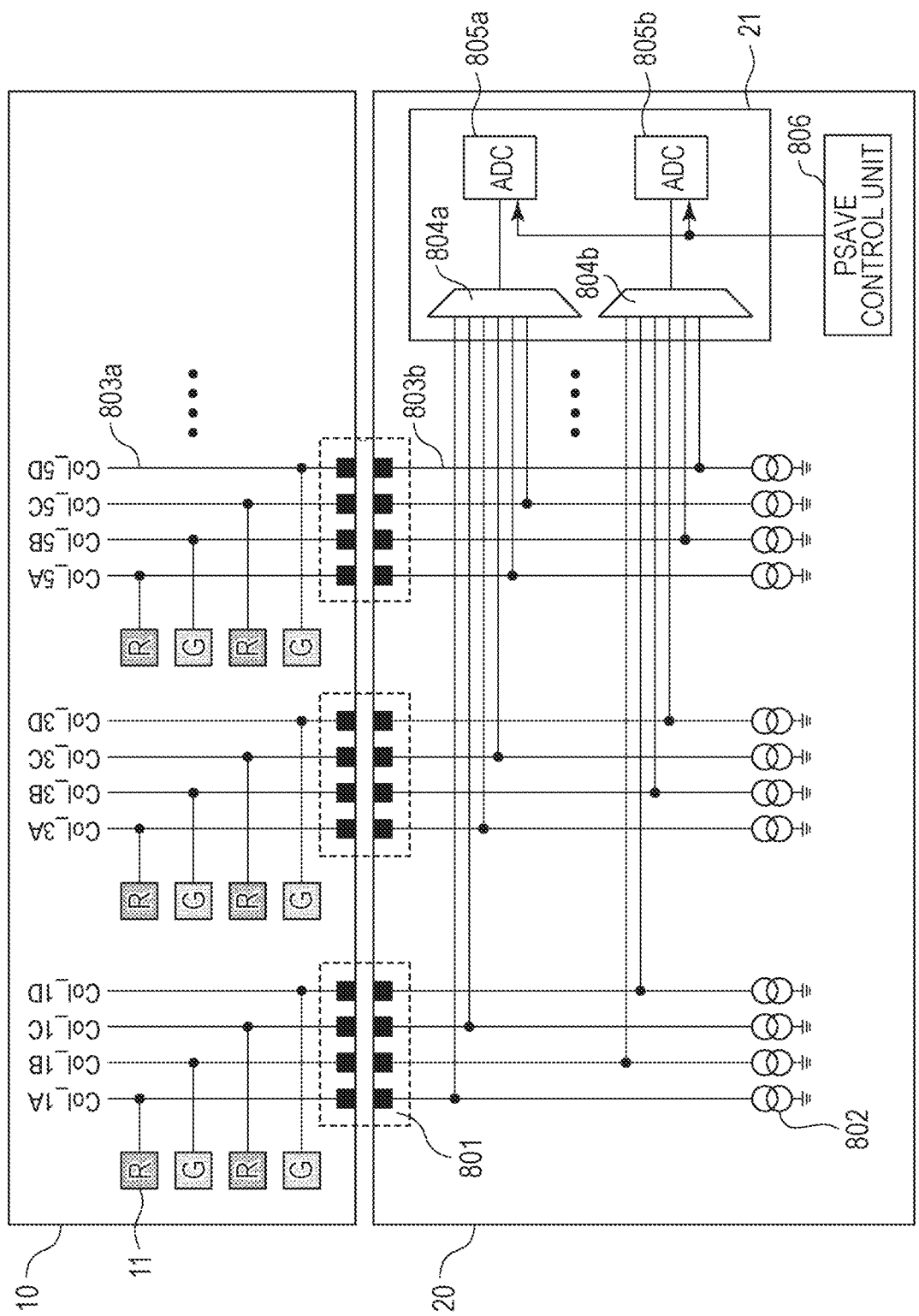
FIG. 8 is a diagram illustrating an example of the configuration of a common-to-column readout circuit of the image sensor in the image capturing apparatus according to the first embodiment of the present invention.

A readout circuit for reading out a signal from each pixel portion 11 in the image sensor 106 will be described with reference to FIG. 8. FIG. 8 illustrates an equivalent circuit about the readout circuit of the image sensor 106. FIG. 8 illustrates only the pixel portions 11 disposed in the odd columns among the pixel portions illustrated in FIG. 6. Each column of the pixel portions 11 in the first substrate 10 has four signal lines 803a. The signal lines 803a are connected to the signal lines 803b having current sources 802 in the second substrate 20 via connection portions 801. Signals output from the respective pixel portions 11 are read out from the first substrate 10 to the second substrate 20 through the signal lines 803a and the signal lines 803b. Hereinafter, the signal lines 803a and the signal lines 803b will be simply referred to as signal lines 803 when they are not distinguished from each other. Each column of the pixel portions 11 has four signal lines 803, and each signal line is represented by col_xN (x: the column number of the pixel portions 11, N: A, B, C, or D). Specifically, the pixel portions 11 in the first row are connected to col_xA. Likewise, the pixel portions 11 in the second to fourth rows are connected to signal lines col_xB to col_xD, respectively. The signal lines 803 are arranged in the same manner as those for the pixel portions 11 in the first column also in the other columns. Although each column of the pixel portions 11 has four signal lines 803 in this embodiment, the configuration is not limited thereto. To perform readout at higher speed, it is preferable to provide more signal lines 803. Note that the number of signal lines is preferably a multiple of 2 or 4. Although FIG. 8 illustrates only one pixel block 12, a plurality of pixel blocks are disposed in matrix in the pixel array. That is, the signal lines 803 are shared with the pixel portions 11 of other pixel blocks.

The individual signal lines 803 are connected to the signal processing units 21 provided in the second substrate 20. In the image sensor 106 according to this embodiment, the signal processing units 21 are provided for the pixel blocks 12, each including a plurality of pixel portions 11, on a one-to-one basis, as illustrated in FIG. 6. Thus, a plurality of signal lines 803 are connected to each signal processing unit 21. The signal processing unit 21 includes a multiplexer circuit 804 (hereinafter referred to as an MPX circuit), and the plurality of signal lines 803 are connected to the input of the MPX circuit 804. Furthermore, the signal processing unit 21 includes an ADC circuit 805, and the ADC circuit 805 is connected to the output of the MPX circuit 804. With the MPX circuit 804 being provided between the plurality of signal lines 803 and the ADC circuit 805, the signal processing unit 21 is capable of processing a plurality of signals at high speed in time division by using the single ADC circuit 805. Although the details will be described in another embodiment described below, the ADC circuit 805 adopts a successive approximation AD conversion method in this embodiment. Use of this method enables higher speed operation and lower power consumption of the ADC circuit 805. In this embodiment, the MPX circuit 804 corresponds to a selecting unit for selecting a signal line to be connected to the ADC circuit 805 from among the plurality of signal lines 803.

In this embodiment, the signal processing unit 21 includes two MPX circuits 804a and 804b, and ADC circuits 805a and 805b correspond thereto, respectively. The MPX circuit 804a is configured to be capable of receiving signals from col_xA and col_xC connected to the pixels having an R color filter. The MPX circuit 804b is configured to be capable of receiving signals from col_xB and col_xD connected to the pixels having a G color filter. The output of the MPX circuit 804a is connected to the ADC circuit 805a, and the output of the MPX circuit 804b is connected to the ADC circuit 805b. Each ADC circuit 805 is capable of independently operating an ADC function. Although the signal processing unit 21 according to this embodiment has a configuration including two MPX circuits and two ADC circuits, the configuration is not limited thereto. The signal processing unit 21 may include only one MPX circuit and only one ADC circuit, or may include three or more MPX circuits and three or more ADC circuits.

In addition, although the signal lines 803 and the MPX circuits 804 are directly connected to each other, a sample hold circuit that is not illustrated may be provided therebetween, and signals read out from the pixel portions 11 may be temporarily held therein.

In addition, the ADC circuits 805 according to this embodiment are capable of performing a power saving operation (standby operation) collectively or individually. To control the power saving operation, a PSAVE control unit 806 is provided in the second substrate 20. In accordance with a control signal from the PSAVE control unit 806, each ADC circuit 805 starts or ends a power saving operation. An example of the power saving operation is an operation of stopping the supply of power or clock to the ADC circuit 805. The PSAVE control unit 806 may be provided in the signal processing unit 21 or may be provided in units of regions, for example, in units of rows or in units of columns.

Although FIG. 8 illustrates only the pixel portions 11 provided in the odd columns, the pixel portions 11 disposed in the even columns also have a similar circuit configuration.

Figure 9:
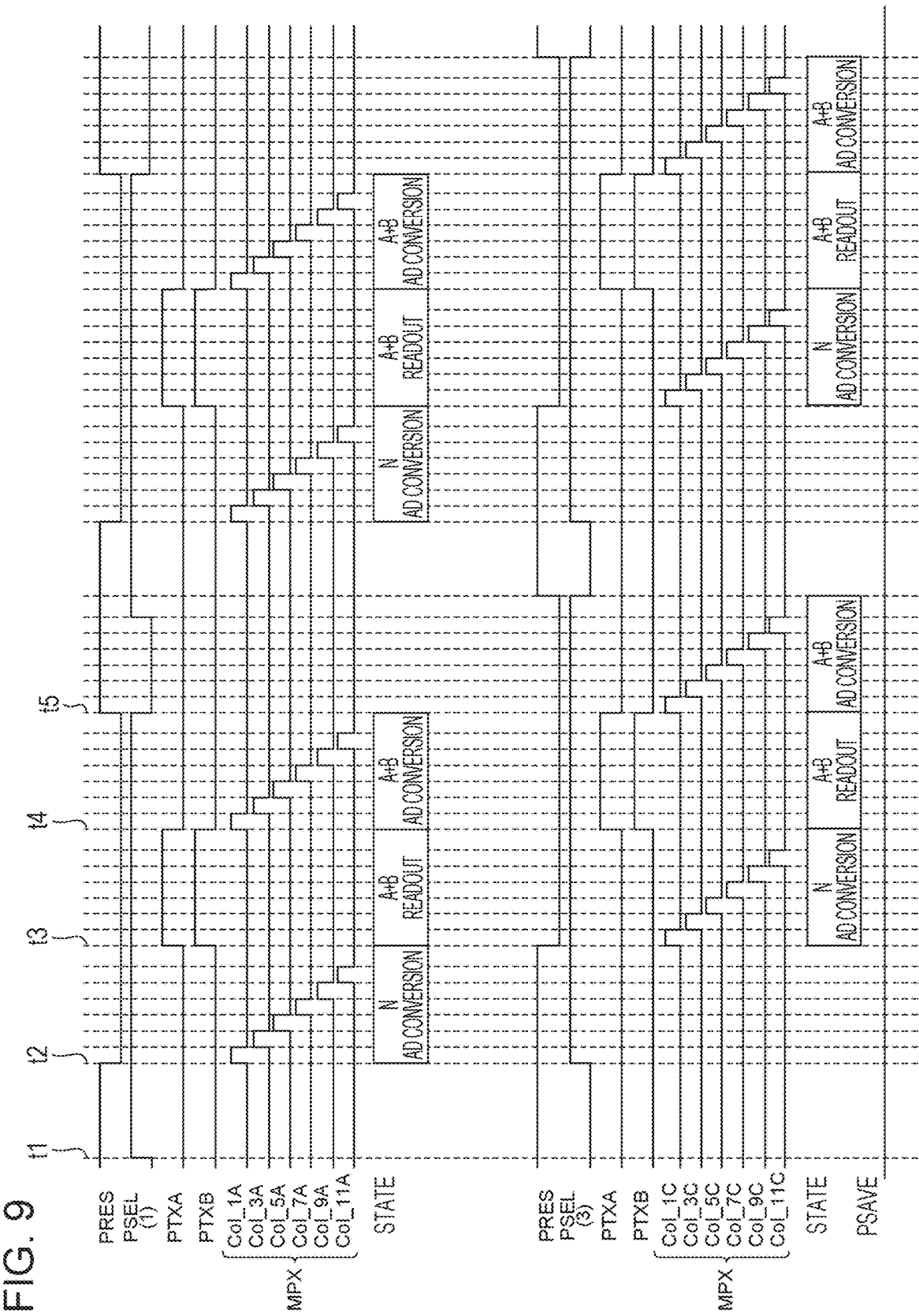
FIG. 9 is a timing chart illustrating a readout operation of the image sensor in the image capturing apparatus according to the first embodiment of the present invention.

FIG. 9 is a diagram illustrating a normal readout operation of the image sensor 106. In the operation in FIG. 9, signals are sequentially read out from the pixel portions 11 without the signals being added. This normal read operation is used mainly in the case of obtaining a high-definition still image. With reference to FIG. 9, a description will be given of the case of outputting only signals for image capturing without outputting signals for focus detection. That is, each pixel portion 11 does not output a first signal based on a signal of only one of the plurality of PDs, but outputs only a second signal based on signals of the plurality of PDs.

A signal PRES in FIG. 9 is a signal supplied from the vertical scanning circuit to the gates of the reset transistors 405 through a control line that is not illustrated. Likewise, a signal PSEL is a signal supplied from the vertical scanning circuit to the gates of the selection transistors 406 of the pixel portions 11 in the N-th row through a control line. The signal PSEL is illustrated together with the row position of the pixel portions 11 to which the signal is output indicated at the end thereof. That is, a signal PSEL(1) is a signal PSEL output to the pixel portions 11 in the first row. A signal PTXA is a signal supplied from the vertical scanning circuit to the gates of the transfer transistors 402a through a control line. A signal PTXB is a signal supplied from the vertical scanning circuit to the gates of the transfer transistors 402b through a control line. The signal PSEL has been described as a signal corresponding to each row. Alternatively, a plurality of signals PSEL may be supplied to each row. With this configuration, a pixel from which a signal is to be output can be selected periodically also in the column direction.

A signal PSAVE in FIG. 9 is a signal supplied from the PSAVE control unit 806 to each ADC circuit 805. In response to input of a signal at a high level to the ADC circuit 805, the ADC circuit 805 starts a power saving operation. In response to input of a signal at a low level to the ADC circuit 805, the ADC circuit 805 performs a normal operation. Although the signal PSAVE is described as a single signal to simplify the description in this embodiment, the signal PSAVE is not limited thereto. For example, in a configuration in which the signal PSAVE can be individually supplied in units of regions in the pixel array or in units of the ADC circuits 805, a power saving operation can be controlled in units of regions.

FIG. 9 illustrates an operation related to the MPX circuit 804*a* and the ADC circuit 805*a*. The MPX circuit 804*a* and the ADC circuit 805*a* receive signals of the pixel portions 11 located in the first and third rows provided with R color filters and in the odd columns among the first to twelfth columns in the arrangement of the pixel block 12, as illustrated in FIG. 8. Thus, FIG. 9 illustrates an operation related to the operation of the pixel portions 11 located in the first and third rows and in the odd columns among the first to twelfth columns.

In addition, FIG. 9 illustrates the names Col_xN of signal lines, indicating the columns selected by the MPX circuit 804*a* as the columns outputting signals to the ADC circuit 805*a*. The meaning of xN is as follows. "x" represents a column number of the pixel portions 11. "N" represents any one of the four signal lines 803 arranged corresponding to the pixel portions 11 in one column.

At time t1, the vertical scanning circuit causes the signals PRES to be output to the pixel portions 11 in the first and third rows to be kept at a high level. Accordingly, the reset transistors 405 of the pixel portions 11 in the first row are in an ON state. Thus, the FD portions 403 are reset to a potential corresponding to the power supply voltage Vdd. In addition, at time t1, the vertical scanning circuit causes the signal PSEL(1) to be at a high level. Accordingly, the selection transistors 406 of the pixel portions 11 in the first row are turned ON. Thus, the currents supplied from the current sources 802 illustrated in FIG. 8 are supplied to the amplification transistors 404 of the pixel portions 11 in the first row through the selection transistors 406. Accordingly, a source follower circuit made up of the power supply voltage Vdd, the amplification transistor 404, and the current source 802 is formed. That is, the amplification transistor 404 performs a source follower operation of outputting a signal corresponding to the potential of the FD portion 403 to the signal line 803 via the selection transistor 406. In this embodiment, a period from time t1 corresponds to an N signal readout period.

At time t2, the vertical scanning circuit causes the signal PRES to be output to the pixel portions 11 in the first row to be at a low level. Accordingly, the reset transistors 405 of the pixel portions 11 in the first row are turned OFF. Thus, resetting of the FD portions 403 is cancelled. Each amplification transistor 404 outputs a signal based on the potential of the FD portion 403 at which resetting has been cancelled to the corresponding signal line 803 illustrated in FIG. 8. This signal is referred to as an N signal (noise signal). Accordingly, N signals are output from the pixel portions 11 to the signal lines 803 in the respective columns. Accordingly, the N signals corresponding to the pixel portions 11 in the odd columns among the first to twelfth columns are input to the MPX circuit 804*a* during the same period.

At and after time t2, the MPX circuit 804*a* sequentially connects the signal lines 803 corresponding to the pixel portions 11 in the odd columns among the first to twelfth columns to the ADC circuit 805*a* in accordance with signals MPX supplied from the TG 113.

The ADC circuit 805*a* AD-converts the N signal of the signal line 803 in the first column corresponding to the pixel portion 11 in the first row, output from the MPX circuit 804*a*, into a digital signal. After that, the ADC circuit 805*a* sequentially AD-converts the N signals output to the signal lines 803*a* corresponding to the pixel portions 11 in the first row in the odd columns among the first to twelfth columns into digital signals. Because each N signal has already been input to the MPX circuit 804*a*, high-speed AD conversion can be performed only by switching an output of the MPX circuit 804*a*. In this embodiment, a period from time t2 corresponds to an N signal AD conversion period.

At time t3, the vertical scanning circuit causes the signal PRES to be input to the pixel portions 11 in the third row to be at a low level. Accordingly, the reset transistors 405 of the pixel portions 11 in the third row are turned OFF. Thus, resetting of the FD portions 403 is cancelled. Each amplification transistor 404 outputs an N signal based on the potential of the FD portion 403 at which the resetting has been cancelled to the signal line 803 illustrated in FIG. 8. Accordingly, N signals are output from the pixel portions 11 in the third row to the signal lines 803 in the respective columns. Accordingly, the N signals corresponding to the pixel portions 11 in the odd columns among the first to twelfth columns are input to the MPX circuit 804*a* during the same period.

At and after time t3, the MPX circuit 804*a* sequentially connects the signal lines 803 corresponding to the pixel portions 11 in the odd columns among the first to twelfth columns to the ADC circuit 805*a* in accordance with signals MPX supplied from the TG 113.

The ADC circuit 805*a* AD-converts the N signal of the signal line 803 in the first column corresponding to the pixel portion 11 in the third row, output from the MPX circuit 804*a*, into a digital signal. After that, the ADC circuit 805*a* sequentially AD-converts the N signals output to the signal lines 803 corresponding to the pixel portions 11 in the odd columns among the first to twelfth columns into digital signals. Because each N signal has already been input to the MPX circuit 804*a*, high-speed AD conversion can be performed only by switching an output of the MPX circuit 804*a*. In this embodiment, a period from time t3 corresponds to an N signal AD conversion period.

In addition, at time t3, the vertical scanning circuit causes the signals PTXA and PTXB to be output to the pixel portions 11 in the first row to be at a high level. Accordingly, the charges (in this embodiment, electrons) stored in the PDs 401*a* and 401*b* are transferred to the FD portion 403 via the transfer transistors 402*a* and 402*b*. In the FD portion 403, the charges of the PDs 401*a* and 401*b* are added. Accordingly, the potential of the FD portion 403 becomes a potential corresponding to the charge obtained by adding the charges of the PDs 401*a* and 401*b*. It is assumed that a signal output from the amplification transistor 404 on the basis of the potential of the FD portion 403 determined by the charge of only the PD 401*a* is defined as an A signal. It is also assumed that a signal output from the amplification transistor 404 on the basis of the potential of the FD portion 403 determined by the charge of only the PD 401*b* is defined as a B signal. In accordance with these assumptions, the signal output from the amplification transistor 404 on the basis of the potential of the FD portion 403 corresponding to the charge obtained by adding the charges of the PDs 401*a* and 401*b* can be defined as an A+B signal, which is the sum of the A signal and the B signal. The A+B signal of the pixel portion 11 in the first row is output to the signal line 803 in each column. Accordingly, the A+B signals corresponding to the pixel portions 11 in the odd columns among the first to twelfth columns are input to the MPX circuit 804*a* during the same period. The A+B signal is a second signal based on signals generated by a plurality of PDs. The second signal can be used as a signal for image capturing. In this embodiment, a period from time t3 corresponds to an A+B signal readout period.

At and after time t4, the MPX circuit 804a sequentially connects the signal lines 803 corresponding to the pixel portions 11 in the odd columns among the first to twelfth columns to the ADC circuit 805a in accordance with signals MPX supplied from the TG 113.

The ADC circuit 805a AD-converts the A+B signal of the signal line 803 in the first column corresponding to the pixel portion 11 in the first row, output from the MPX circuit 804a, into a digital signal. After that, the ADC circuit 805a sequentially AD-converts the A+B signals output to the signal lines 803 corresponding to the pixel portions 11 in the odd columns among the first to twelfth columns into digital signals. Because each A+B signal has already been input to the MPX circuit 804a, high-speed AD conversion can be performed only by switching an output of the MPX circuit 804a. In this embodiment, a period from time t4 corresponds to an A+B signal AD conversion period.

At time t4, the vertical scanning circuit causes the signals PTXA and PTXB to be output to the pixel portions 11 in the third row to be at a high level. Accordingly, the A+B signals of the pixel portions 11 in the third row are output to the signal lines 803 in the individual columns. Accordingly, the A+B signals corresponding to the pixel portions 11 in the odd columns among the first to twelfth columns are input to the MPX circuit 804a during the same period. In this embodiment, a period from time t4 corresponds to an A+B signal readout period.

At and after time t5, the MPX circuit 804a sequentially connects the signal lines 803 corresponding to the pixel portions 11 in the odd columns among the first to twelfth columns to the ADC circuit 805a in accordance with signals MPX supplied from the TG 113.

The ADC circuit 805a AD-converts the A+B signal of the signal line 803 in the first column corresponding to the pixel portion 11 in the third row, output from the MPX circuit 804a, into a digital signal. After that, the ADC circuit 805a sequentially AD-converts the A+B signals output to the signal lines 803 corresponding to the pixel portions 11 in the odd columns among the first to twelfth columns into digital signals. Because each A+B signal has already been input to the MPX circuit 804a, high-speed AD conversion can be performed only by switching an output of the MPX circuit 804a. In this embodiment, a period from time t5 corresponds to an A+B signal AD conversion period.

These operations are performed in parallel on the second and fourth rows provided with G color filters. Furthermore, these operations are also performed on the pixel portions 11 located in the even columns. As a result of performing the operations on the individual pixel blocks 12 in parallel or sequentially, image signals of one screen can be obtained. In the case of obtaining an A signal or a B signal, control is not performed on the signal PTXA or the signal PTXB at the timing of reading out an A+B signal. Although the details will be described in another embodiment, it is preferable to read the signal after reading out the N signal and before reading out the A+B signal.

Now, one characteristic effect of this embodiment will be described.

In the operation illustrated in FIG. 9, a plurality of operations are performed in parallel as follows.

(1) A parallel operation of AD conversion of N signals corresponding to the pixel portions 11 in the first row and readout of N signals corresponding to the pixel portions 11 in the third row (2) A parallel operation of AD conversion of N signals corresponding to the pixel portions 11 in the third row and readout of A+B signals corresponding to the pixel portions 11 in the first row (3) A parallel operation of AD conversion of A+B signals corresponding to the pixel portions 11 in the first row and readout of A+B signals corresponding to the pixel portions 11 in the third row These parallel operations can shorten the waiting time from when the ADC circuit 805a ends AD conversion to when the ADC circuit 805a performs the next AD conversion. Accordingly, the period required for AD conversion of signals output from all the pixel portions 11 can be shortened. Thus, the frame rate in the entire image capturing apparatus 100 can be increased.

In the example in FIG. 9, each N signal readout period and each A+B signal readout period are controlled during the same period in the signal lines 803 connected to the same MPX circuit 804, but the operation is not limited thereto. An important feature is that, during the same period as the period when an ADC circuit 805 performs AD conversion on each signal, a readout operation for other signal lines 803 connectable to the ADC circuit 805 is started. That is, it is preferable to appropriately change the readout timing or the readout and AD conversion timings for each signal line 803 in accordance with image capturing conditions (ISO speed and frame rate) or the property of the image sensor 106. For example, signals are sequentially AD-converted during each AD conversion period starting from time t2 and time t4, but the AD conversion timing varies between the first column and another column. The readout periods do not need to end simultaneously and only need to end by the AD conversion timing. Thus, although the readout periods of the individual columns simultaneously end at time t2 and time t4 in FIG. 9, the readout periods of the individual columns may be deferred in accordance with the AD conversion timings. More specifically, the end timing of the readout period of the third column is set to be immediately before the end of AD conversion of the first column. Also, the end timings of the readout periods of the other columns can be set to be immediately before the end of AD conversion. With this operation with such timings, AD conversion can be performed immediately after readout of signals, and a wasted time until the start of AD conversion can be shortened.

The ends of readout periods have been described above, and the same applies to the start. In particular, in a case where the end timings of readout periods change, it is preferable to change the start timings of the readout periods such that the lengths of readout periods of individual columns are substantially equal. Furthermore, although the readout periods simultaneously start at time t1 and time t3 in FIG. 9, for example, the starts of the readout periods can be advanced to the time points at which the signals MPX (Col_xN) corresponding to the AD conversion periods in individual columns have fallen. That is, it is not necessary to wait for the end of AD conversion in all the columns, and it is possible to start reading out the next signal at the timing when the AD conversion period for each column ends. Accordingly, the frame rate can be further increased. In a case where the readout periods for a plurality of signal lines 803 are not the same but are different, the load on the current sources 802 can be reduced. That is, to individually perform readout operations on the corresponding pixel portions 11 at different timings, the signal PRES and the signals PTXA and PTXB require a plurality of wiring lines for each row. This makes control complicated, but an effect of reducing peak consumption current supplied to the image sensor 106 can be obtained, and power consumption can be reduced as a whole. It is preferable to appropriately change timings for the individual signal lines 803, but the timings may be changed in units of a predetermined number of signal lines 803 to avoid excessive complexity of the circuit.

Figure 10:
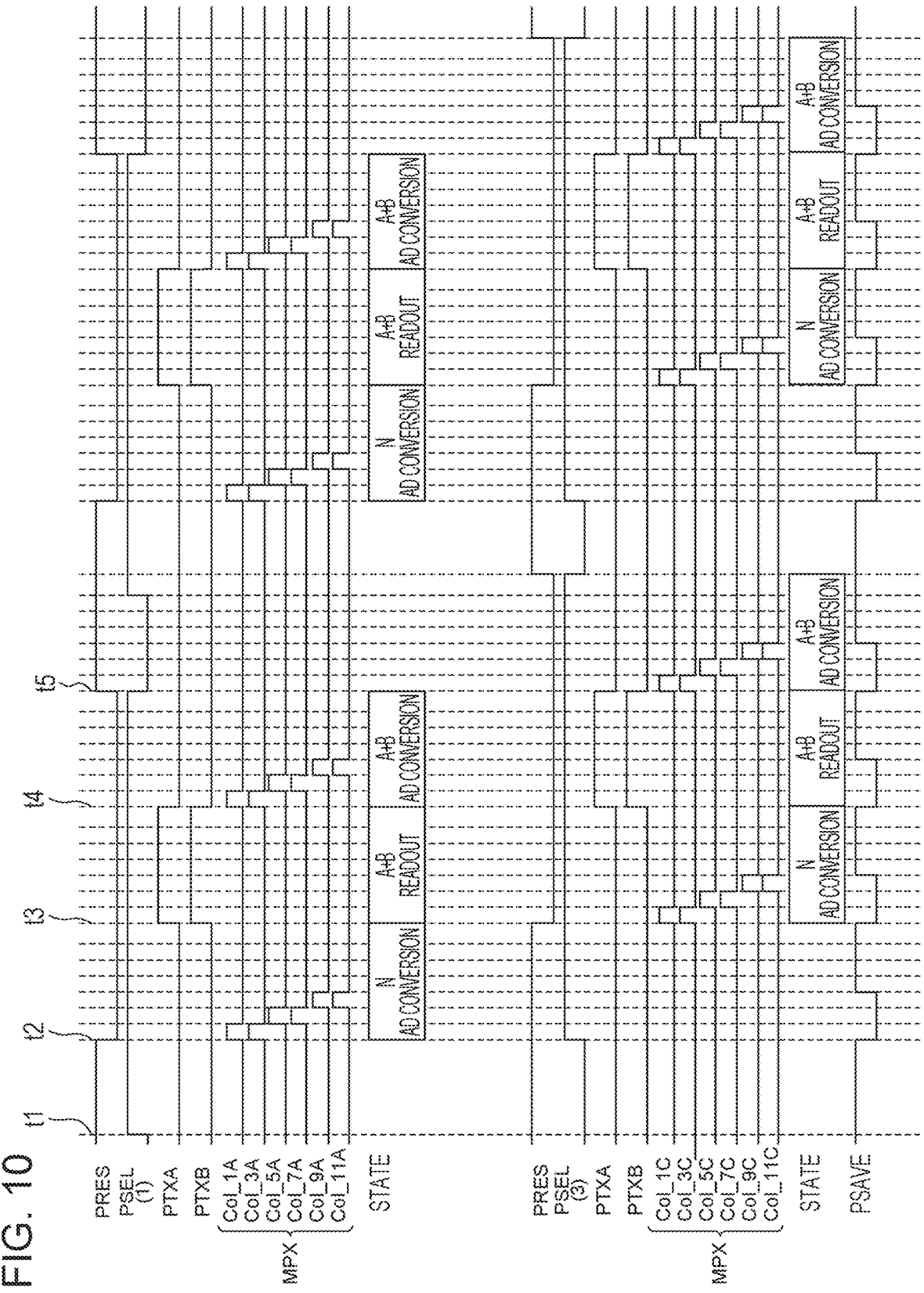
FIG. 10 is a timing chart illustrating a readout operation of the image sensor in the image capturing apparatus according to the first embodiment of the present invention.

Next, a characteristic readout operation of the image sensor 106 in the image capturing apparatus 100 according to this embodiment will be described with reference to FIG. 10. FIG. 10 is a diagram illustrating an addition-and-readout operation of the image sensor 106. In the operation in FIG. 10, signals are sequentially read out from the pixel portions 11, with the signals being added before AD conversion. This addition-and-readout operation is used mainly in the case of obtaining a moving image. In FIG. 10, a description will be given of the case of not outputting signals for focus detection but outputting only signals for image capturing. The signal lines illustrated in FIG. 10 are the same as those in FIG. 9. Furthermore, the description of an operation common to the normal readout operation will be omitted.

At time t2, the vertical scanning circuit causes the signal PRES to be output to the pixel portions 11 in the first row to be at a low level. Accordingly, N signals are output from the pixel portions 11 to the signal lines 803 in the individual columns. Accordingly, the N signals corresponding to the pixel portions 11 in the odd columns among the first to twelfth columns are input to the MPX circuit 804a during the same period.

At and after time t2, the MPX circuit 804a sequentially connects the signal lines 803 corresponding to the pixel portions 11 in the odd columns among the first to twelfth columns to the ADC circuit 805a in accordance with signals MPX supplied from the TG 113. In the addition-and-readout operation, unlike in the normal readout operation, a plurality of signal lines 803 are simultaneously connected to the ADC circuit 805a. With this operation, an output of the MPX circuit 804a becomes substantially equivalent to a signal obtained by adding and averaging the signals output to the signal lines 803 connected simultaneously. Accordingly, signals can be added among the signal lines 803. In this embodiment, to add two adjacent columns of the same color, such as the first column and the third column, the corresponding signal lines 803 are simultaneously connected to the ADC circuit 805a. Accordingly, the number of times of necessary AD conversion becomes half that in the normal readout operation. As a whole, AD conversion can be completed in half the time of AD conversion in the normal readout operation. In this embodiment, the signal lines 803 and the MPX circuit 804 correspond to an adder circuit for adding signals from the pixel portions 11.

Furthermore, at the timing when AD conversion ends at or after time t2, the signal PSAVE to be output to each ADC circuit 805 is set to a high level. Accordingly, the ADC circuit 805 is switched to a power saving operation. At time t3, the signal PSAVE is set to a low level and the power saving operation ends. Accordingly, it becomes possible to perform AD conversion on the next signal.

In FIG. 10, the signal PSAVE is set to a high level at the timing when AD conversion of each row or each pixel block ends and corresponding to a horizontal blanking period. This enables further power saving. Because each ADC circuit 805 operates independently, it is not always necessary to perform a power saving operation in the entire image sensor 106. It is preferable to appropriately perform a power saving operation in accordance with the operation of each ADC circuit 805.

As a result of adding signals by using the MPX circuit 804 provided in the preceding stage of the ADC circuit 805, the time required for AD conversion can be shortened. In addition, as a result of causing the ADC circuit 805 to perform a power saving operation in the shortened time, power saving of the entire image sensor 106 can be realized with the frame rate being maintained. Although signals in two columns are added in this embodiment, signals in three or more columns may be added. By increasing the number of columns for which the signals are added, the AD conversion time can be further shortened and the power can be further saved. Furthermore, the frame rate can be increased.

In the case of providing a sample hold circuit between the signal lines 803 and the MPX circuit 804, it is not necessary to simultaneously connect a plurality of signal lines 803 to the MPX circuit 804 at the time of adding signals. For example, addition of signals can be performed by further providing a switch circuit or the like for connecting capacitances (capacitors or the like) holding signals in the sample hold circuit. In addition, an addition-and-readout operation may be performed by combining a signal addition method of connecting capacitances and an addition method of simultaneously connecting a plurality of signal lines 803 to the MPX circuit 804.

Although an operation of adding signals of the same color has been described in this embodiment, signals of different colors may be added. Signals of different colors can be used as signals for AF or exposure calculation other than generation of an image signal.

Although each timing chart illustrates only readout timings, each PD 401 in each pixel portion 11 is reset before the readout timings. To make the storage period uniform in an entire screen, scanning for each pixel portion 11 in the reset operation is performed in accordance with the readout timing described in this embodiment.

Second Embodiment

In the first embodiment, an example has been given in which addition of signals in the column direction is performed by simultaneously connecting a plurality of signal lines 803 connected to the MPX circuit 804 to the ADC circuit 805. In this embodiment, an example of connection between the signal lines 803 and the MPX circuit 804 different from the first embodiment will be given, and an operation of adding signals also in the row direction will be described.

Figure 11:
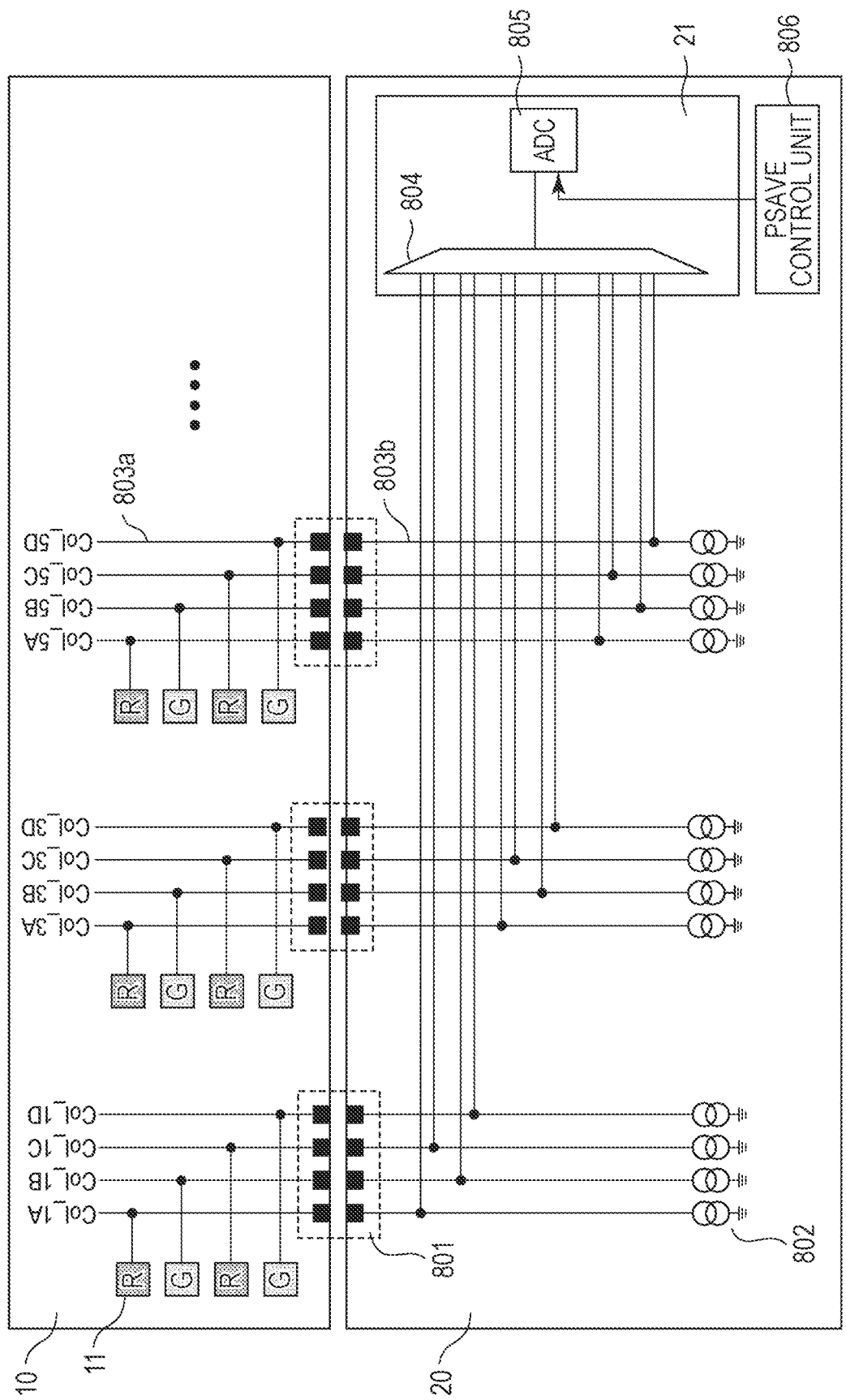
FIG. 11 is a diagram illustrating an example of the configuration of a common-to-column readout circuit of an image sensor in an image capturing apparatus according to a second embodiment of the present invention.

A readout circuit for reading out signals from the individual pixel portions 11 in the image sensor 106 according to this embodiment will be described with reference to FIG. 11. FIG. 11 corresponds to FIG. 8 in the first embodiment and illustrates an equivalent circuit about the readout circuit of the image sensor 106. The same components as those in FIG. 8 are denoted by the same reference numerals, and the description thereof will be omitted.

In FIG. 11, the signals output from the individual pixel portions 11 are read out through the signal lines 803. Each column of the pixel portions 11 has four signal lines 803. The individual signal lines are represented by col_xN (x: the column number of the pixel portions 11, N: A, B, C, or D). The signal lines 803 are arranged in the same manner as those for the pixel portions 11 in the first column also in the other columns. The circuit in FIG. 11 is different from the circuit according to the first embodiment in the manner of connection between the signal lines 803 and the MPX circuit 804. Specifically, although each column of the pixel portions 11 has four signal lines 803 in this embodiment, the configuration is not limited thereto. To achieve higher-speed readout, it is preferable to provide more signal lines 803.

Note that the number of signal lines is preferably a multiple of 2 or 4, or a multiple of the number of signals to be added.

In FIG. 11, the signals of the pixel portions 11 that have R color filters and that are located in the first and third rows and in the odd columns among the first to twelfth columns are input to the MPX circuit 804 and the ADC circuit 805. Furthermore, the signals of the pixel portions 11 that have G color filters and that are located in the second and fourth rows and in the odd columns among the first to twelfth columns are input thereto. In FIG. 11, only the odd columns that are necessary for description are illustrated, and the illustration of the other odd columns and the even columns is omitted for simplicity.

Figure 12:
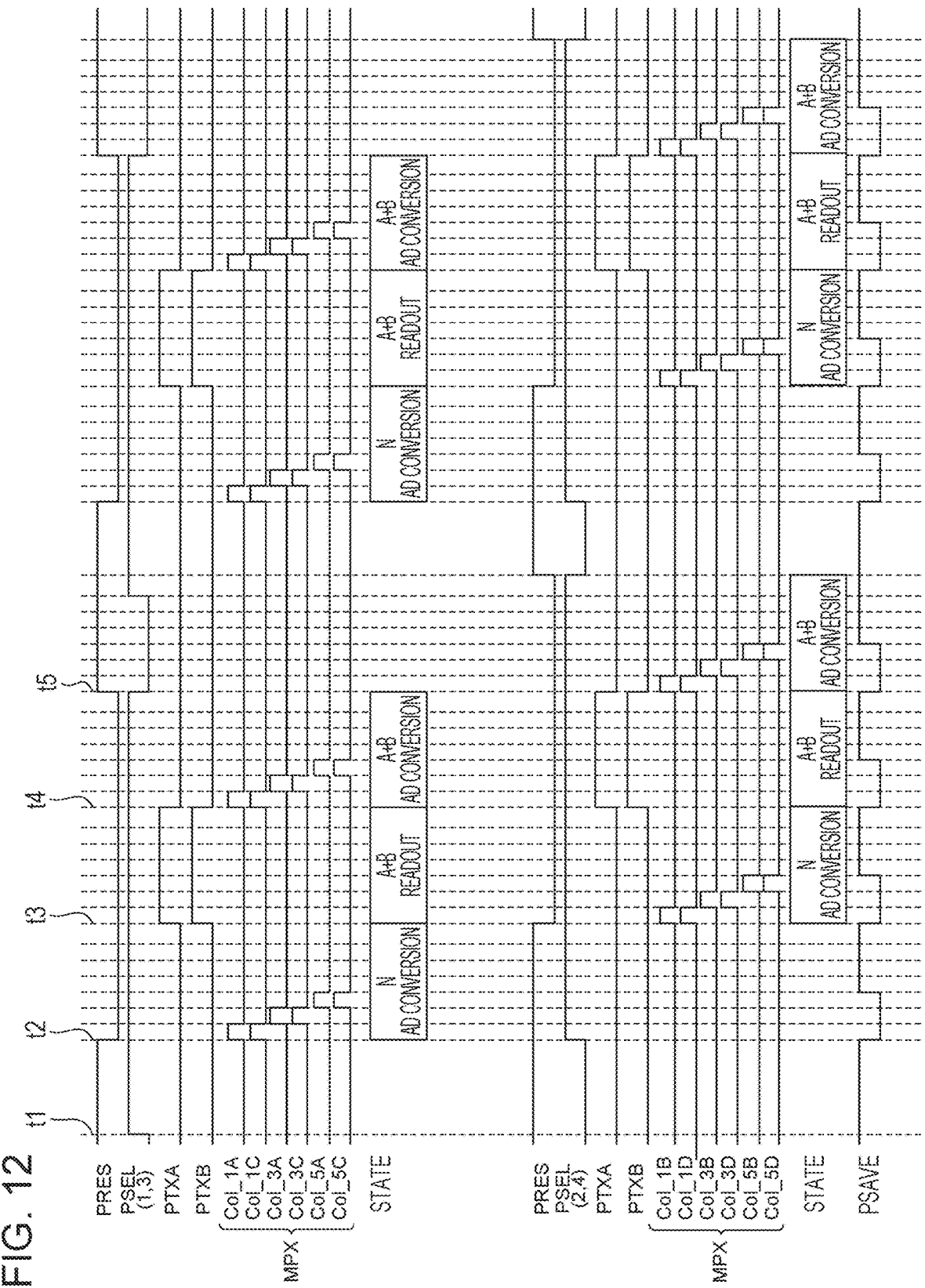
FIG. 12 is a timing chart illustrating a readout operation of the image sensor in the image capturing apparatus according to the second embodiment of the present invention.

FIG. 12 is a diagram illustrating an addition-and-readout operation of the image sensor 106 in the second embodiment. In the operation in FIG. 12, signals are sequentially read out from the pixel portions 11, with the signals being added before AD conversion. This addition-and-readout operation is used mainly in the case of obtaining a moving image. In FIG. 12, a description will be given of the case of not outputting signals for focus detection but outputting only signals for image capturing. In FIG. 12, the signal lines are the same as those in FIG. 10, and only the signals input to the MPX circuit 804 are different. Furthermore, the description of an operation common to the operation illustrated in the first embodiment will be omitted.

At time t2, the vertical scanning circuit causes the signal PRES to be output to the pixel portions 11 in the first row and the signal PRES to be output to the pixel portions 11 in the third row to be at a low level. Accordingly, N signals are output from the pixel portions 11 to the signal lines 803 in the individual columns. Accordingly, the N signals corresponding to the pixel portions 11 in the first and third rows and in the odd columns among the first to twelfth columns are input to the MPX circuit 804.

At and after time t2, the MPX circuit 804 sequentially connects the signal lines 803 corresponding to the pixel portions 11 in the odd columns among the first to twelfth columns to the ADC circuit 805 in accordance with signals MPX supplied from the TG 113. In the addition-and-readout operation in this embodiment, a plurality of signal lines 803 are simultaneously connected to the ADC circuit 805. Specifically, Col_xA corresponding to the pixel portions 11 in the first row and Col_xC corresponding to the pixel portions 11 in the third row are simultaneously connected. With this operation, an output of the MPX circuit 804 is a signal obtained by adding and averaging the signals output to the signal lines 803 connected simultaneously, and addition of signals in the row direction can be performed. In this embodiment, to add two adjacent rows of the same color, such as the first row and the third row, the corresponding signal lines 803 need to be simultaneously connected to the ADC circuit 805. Accordingly, a signal corresponding to AD conversion for two rows can be obtained by performing AD conversion once, and AD conversion can be completed in half the time of AD conversion in the normal readout operation.

Furthermore, at the timing when AD conversion ends at or after time t2, the signal PSAVE to be output to each ADC circuit 805 is set to a high level. Accordingly, the ADC circuit 805 is switched to a power saving operation. Immediately before time t3, the signal PSAVE is set to a low level and the power saving operation ends. Accordingly, it becomes possible to perform AD conversion on the next signal.

In this embodiment, an operation of performing only addition in the row direction has been illustrated. By combining the addition-and-readout operation in the column direction as illustrated in the first embodiment, it becomes possible to simultaneously perform addition in both the row direction and the column direction.

As a result of enabling the connection from the pixel portions 11 corresponding to the columns or rows as a target of addition to the MPX circuit 804 provided before the ADC circuit 805, both the normal readout operation and the addition-and-readout operation can be performed. Furthermore, as a result of causing the ADC circuit 805 to perform a power saving operation in a time in which the AD conversion time is shortened, power saving of the entire image sensor 106 can be realized with the frame rate being maintained. Although signals in two rows are added in this embodiment, signals in three or more rows may be added. Alternatively, addition in the column direction may be combined. In that case, the number of columns as a target of addition need not necessarily be the same as the number of rows as a target of addition.

Figure 13:
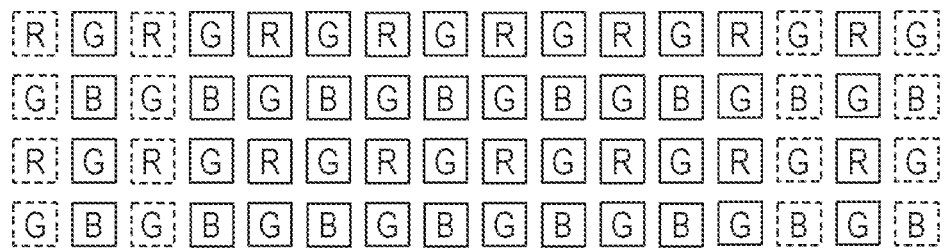
FIG. 13 illustrates an example of a pixel block according to the second embodiment of the present invention.

FIG. 6 illustrates an example in which one signal processing unit 21 is disposed for one pixel block 12 including a predetermined number of pixel portions 11. The pixel portions 11 included in the pixel block 12 need not necessarily be adjacent to each other. For example, in consideration of the color center of gravity (sampling cycle) after addition of pixels of the same color, the block formed of the pixel portions 11 represented by solid lines in FIG. 13 may be regarded as the pixel block 12, and the signal lines 803 from the individual pixel portions 11 may be connected to one MPX circuit 804. As a result of adopting the pixel block illustrated in FIG. 13, the color centers of gravity after addition can be matched in the column direction in the case of adding signals of three pixels in the column direction. Also, matching of the color centers of gravity can be achieved in the vertical direction by a similar disposition in the vertical direction.

Third Embodiment

In the first embodiment and the second embodiment, a description has been given of control of adding signals in the MPX circuit 804 to shorten an AD conversion time and causing the ADC circuit 805 to perform a power saving operation during that time. In this embodiment, a description will be given of control of a power saving operation for the ADC circuit 805 that is not used during an addition-and-readout operation. The MPX circuit 804 performs addition of signals also in this embodiment.

Figure 14:
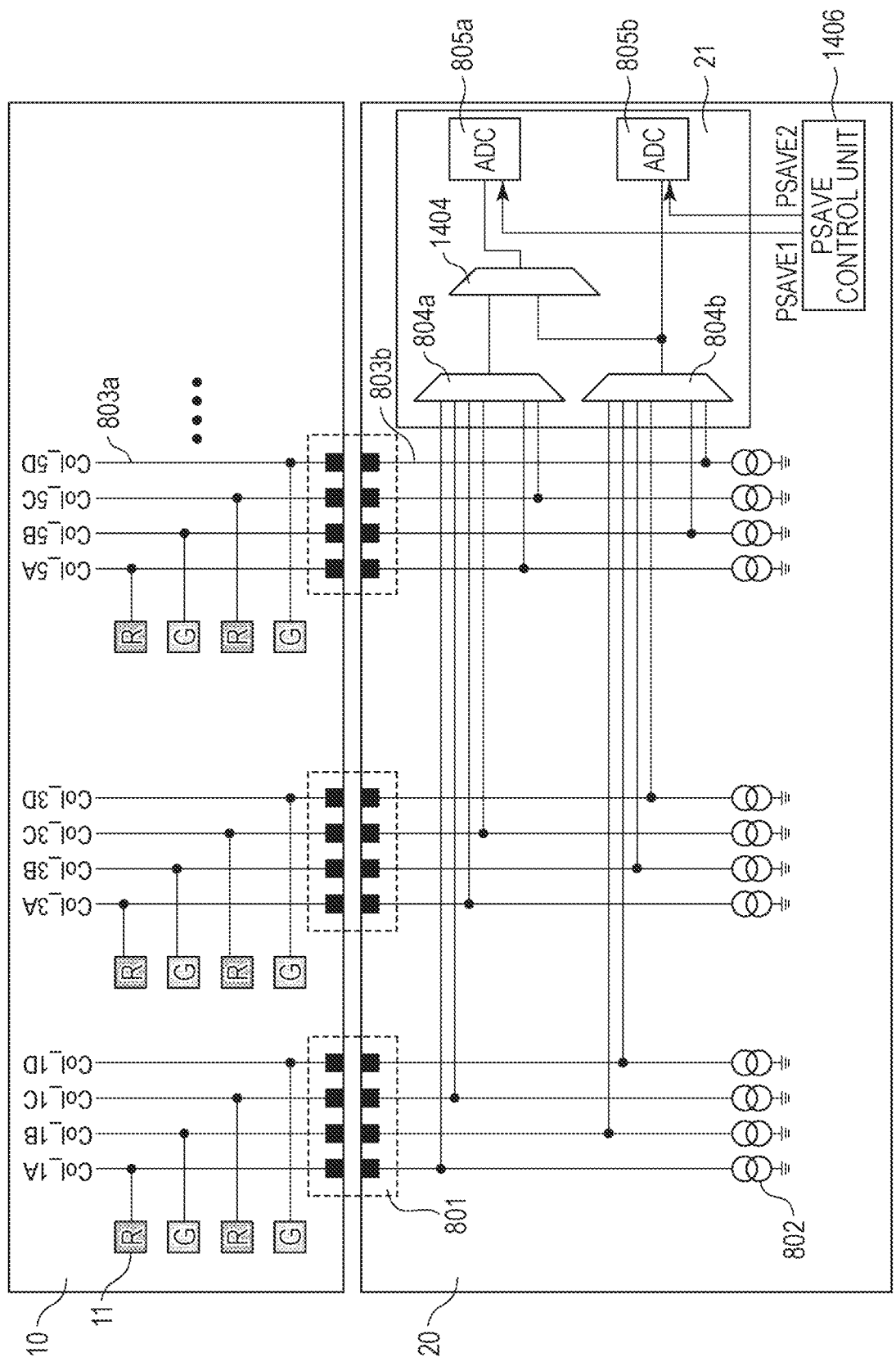
FIG. 14 is a diagram illustrating an example of the configuration of a common-to-column readout circuit of an image sensor in an image capturing apparatus according to a third embodiment of the present invention.

A readout circuit for reading out signals from the individual pixel portions 11 in the image sensor 106 according to this embodiment will be described with reference to FIG. 14. FIG. 14 corresponds to FIG. 8 in the first embodiment and illustrates an equivalent circuit about the readout circuit of the image sensor 106. The same components as those in FIG. 8 are denoted by the same reference numerals.

In FIG. 14, the signals output from the individual pixel portions 11 are read out through the signal lines 803. Each column of the pixel portions 11 has four signal lines 803. The individual signal lines are represented by col_xN (x: the column number of the pixel portions 11, N: A, B, C, or D). The signal lines 803 are arranged in the same manner as those for the pixel portions 11 in the first column also in the other columns. The circuit in FIG. 14 is different from the circuits according to the first embodiment and the second embodiment in an MPX circuit 1404 and a PSAVE control unit 1406 added to the configuration of the signal processing unit 21.

In FIG. 14, the signals of the pixel portions 11 that have R color filters and that are located in the first and third rows and in the odd columns among the first to twelfth columns are input to the MPX circuit 804a. Also, the signals of the pixel portions 11 that have G color filters and that are located in the second and fourth rows and in the odd columns among the first to twelfth columns are input to the MPX circuit 804b. An output of the MPX circuit 804a and an output of the MPX circuit 804b are input to the MPX circuit 1404. An output of the MPX circuit 1404 is controlled on the basis of a signal MPX2, which is a control signal, and a switching operation to output either the output of the MPX circuit 804a or the output of the MPX circuit 804b to the ADC circuit 805a is performed. Specifically, the output of the MPX circuit 804a is output in a case where the signal MPX2 is at a low level, and the output of the MPX circuit 804b is output in a case where the signal MPX2 is at a high level. With this operation, the output of the MPX circuit 804a and the output of the MPX circuit 804b can be AD-converted by the single ADC circuit 805a.

In addition, the output of the MPX circuit 804b is input to the ADC circuit 805b, which AD-converts the output of the MPX circuit 804b. However, in the case of AD-converting the output of the MPX circuit 804a and the output of the MPX circuit 804b by using the single ADC circuit 805a in the above-described manner, it is not necessary to cause the ADC circuit 805b to operate.

In addition, the ADC circuits 805 according to this embodiment are each capable of individually performing a power saving operation. To control the power saving operation, the second substrate 20 is provided with the PSAVE control unit 1406. In accordance with individual control signals (PSAVE1 and PSAVE2) from the PSAVE control unit 1406, the ADC circuit 805a and the ADC circuit 805b start or stop a power saving operation. Thus, in a case where only the ADC circuit 805a performs an AD conversion operation, it is possible to cause only the ADC circuit 805b to perform a power saving operation by using the signal PSAVE2.

Figure 15:
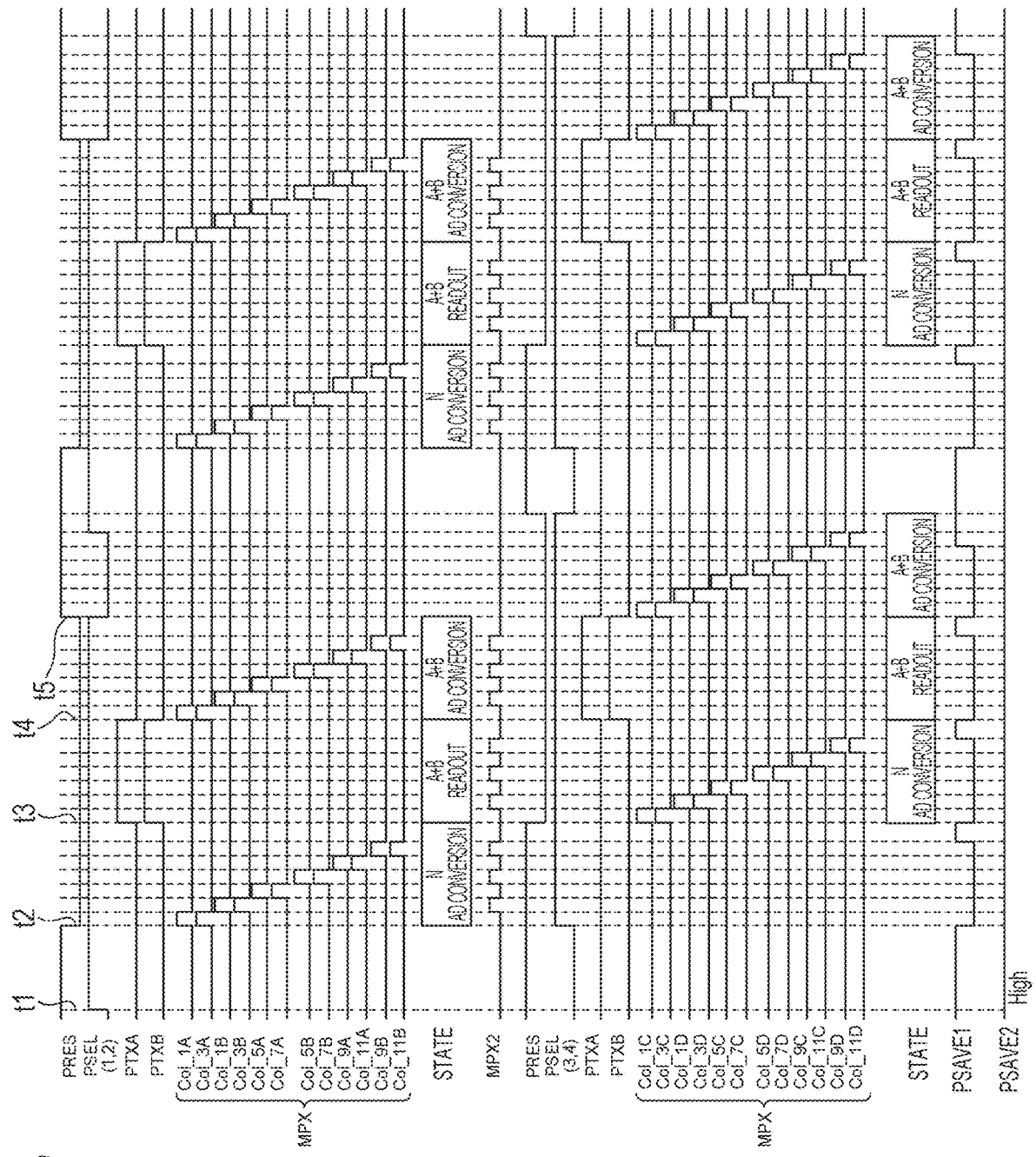
FIG. 15 is a timing chart illustrating a readout operation of the image sensor in the image capturing apparatus according to the third embodiment of the present invention.

FIG. 15 is a diagram illustrating an addition-and-readout operation of the image sensor 106 in the third embodiment. In the operation in FIG. 15, signals are sequentially read out from the pixel portions 11, with the signals being added before AD conversion. This addition-and-readout operation is used mainly in the case of obtaining a moving image. In FIG. 15, a description will be given of the case of not outputting signals for focus detection but outputting only signals for image capturing. The signal lines illustrated in FIG. 15 include, in addition to those in FIG. 10 and so forth, signal lines for the signal MPX2 for controlling the MPX circuit 1404 and the signals PSAVE1 and PSAVE2 from the PSAVE control unit 1406. Furthermore, the description of an operation common to the operations illustrated in the first embodiment and the second embodiment will be omitted.

At time t2, the vertical scanning circuit causes the signal PRES to be output to the pixel portions 11 in the first and second rows to be at a low level. Accordingly, N signals are output from the pixel portions 11 to the signal lines 803 in the individual columns. Accordingly, the N signals corresponding to the pixel portions 11 in the first and second rows and in the odd columns among the first to twelfth columns are input to the MPX circuit 804a and the MPX circuit 804b.

At and after time t2, the MPX circuit 804 sequentially connects the signal lines 803 corresponding to the pixel portions 11 in the odd columns among the first to twelfth columns to the ADC circuit 805a in accordance with signals MPX and a signal MPX2 supplied from the TG 113. In the addition-and-readout operation in this embodiment, a plurality of signal lines 803 are simultaneously connected to the ADC circuit 805a. Specifically, Col_1A corresponding to the pixel portion 11 in the first row and the first column and Col_3A corresponding to the pixel portion 11 in the first row and the third column are simultaneously connected to the MPX circuit 804a. With this operation, an output of the MPX circuit 804a is a signal obtained by adding and averaging the signals output to the signal lines 803 connected simultaneously, and addition of signals in the column direction can be performed. At the same timing, the signal MPX2 is controlled to a low level, and an output of the MPX circuit 804a is input to the ADC circuit 805a as an output of the MPX circuit 1404.

Furthermore, at the timing when AD conversion for the first and third columns ends at or after time t2, Col_1B corresponding to the pixel portion 11 in the second row and the first column and Col_3B corresponding to the pixel portion 11 in the second row and the third column are simultaneously connected to the MPX circuit 804b. With this operation, an output of the MPX circuit 804b is a signal obtained by adding and averaging the signals output to the signal lines 803 connected simultaneously, and addition of signals in the column direction can be performed. At the same timing, the signal MPX2 is controlled to a high level, and an output of the MPX circuit 804b is input to the ADC circuit 805a as an output of the MPX circuit 1404.

As a result of performing the addition-and-readout operation by repeating the above-described operation, an AD conversion operation for two rows can be completed in the time for one row in the normal readout operation. That is, two ADC circuits 805 are required in the normal readout operation, whereas one ADC circuit 805 is enough to read out signals from the entire pixel block 12. Thus, the ADC circuit 805b that has become unnecessary can always perform a power saving operation during the addition-and-readout operation in accordance with the signal PSAVE2 controlled to a high level, and power consumption can be significantly reduced.

Also in this embodiment, as in the second embodiment, power can be further saved by controlling the signal PSAVE to a high level at the time point when the AD conversion operation in the ADC circuit 805a has finished.

As a result of providing a plurality of MPX circuits in the signal processing unit 21, it is possible to provide an ADC circuit that is not required to be operated during an addition-and-readout operation. In addition, as a result of causing the ADC circuit to perform a power saving operation, power saving of the entire image sensor 106 can be achieved, with the frame rate being maintained. Although signals in two columns are added in this embodiment, signals in three or more columns may be added. Alternatively, addition in the row direction may be combined. In that case, the number of columns as a target of addition need not necessarily be the same as the number of rows as a target of addition.

In this embodiment, the AD conversion time is shortened by adding signals of a plurality of signal lines 803. The AD conversion time can be shortened also by combining a thinning operation. For example, in the embodiment, only the signals of the signal lines 803 in the first, fifth, and ninth columns may be read out at predetermined timings illustrated in FIG. 15, without connecting the signal lines 803 in the third, seventh, and eleventh columns.

Furthermore, in the case of performing thinned-out reading, the MPX circuit 1404 may be omitted by devising the connection between the signal lines 803 and the MPX circuit 804. As an example, the signal lines 803 from the pixel portions 11 as a target to be thinned out (for example, the pixel portions 11 in the third, seventh, and eleventh columns) are connected to the MPX circuit 804b. The signal lines 803 from the pixel portions 11 as a target of readout (for example, the pixel portions 11 in the first, fifth, and ninth columns) are connected to the MPX circuit 804a. With such connections, the MPX circuit 804b and the ADC circuit 805b save power during thinned-out reading, and accordingly an effect similar to that of the third embodiment can be obtained.

In the first to third embodiments, signals are read out first from the pixel portions 11 located at an end of the pixel block 12 (for example, the first column), but the signal readout order is not limited thereto. For example, signals may be read out in a reversed order or signals may be read out from alternate pixel portions.

Fourth Embodiment

In the first embodiment to the third embodiment, examples have been given in which the power saving operation of the ADC circuit 805 is controlled when an AD conversion operation is not performed during a readout period while the MPX circuit 804 is performing signal addition or the like. However, in an operation of the image capturing apparatus 100 using the image sensor 106, a power saving operation can be set to the ADC circuit 805 at another timing.

FIG. 16 illustrates timings in the case of capturing one image by the image capturing apparatus 100. A signal VD is a vertical synchronization signal and is supplied from the TG 113 to the image sensor 106. The signal VD is also supplied to other components, such as the DFE 108 and the DSP 109, and synchronizes the operation timing of the entire image capturing apparatus 100. The cycle of the signal VD corresponds to the frame rate for obtaining a moving image, and is $1/120$ seconds in this embodiment. An internal HD is a horizontal synchronization signal, which is an internal signal generated by a circuit in the image sensor 106 in synchronization with the signal VD supplied from the TG 113. The operation timings of the image sensor 106 are specified by the internal HD, for example, a reset operation and a readout operation for the pixel portions 11 are controlled. The image sensor 106 outputs signals from the pixel portions 11 corresponding to a predetermined number of rows during one HD period. In this embodiment, the time required for the image sensor 106 to output image signals of one frame (a readout period) is $1/180$ seconds.

As illustrated in FIG. 16, in a case where the readout period required to obtain one image is $1/180$ seconds, the readout speed is sufficiently high relative to the frame rate, and thus the residual time is a blanking period. Neither signal readout nor AD conversion is performed during the blanking period. Thus, a power saving operation can be performed during this period. As illustrated in FIG. 16, the signal PSAVE is set to a high level during the blanking period, and accordingly a power saving operation can be achieved.

A constant frame rate is required to obtain a smooth moving image. In a case where the frame rate is not variable but is constant, the blanking period depends on the amount of signals read out from the image sensor 106. For example, assume the case of obtaining a still image while capturing a moving image having a predetermined frame rate (for example, 60 fps), as illustrated in FIG. 17. It is assumed that, in a case where 8 million pixels are required for a moving image, four times the pixels, 32 million pixels, are used for a still image. In this case, the blanking period is inevitably shorter during still image capturing than during moving image capturing. In such a case, it is preferable to perform a power saving operation only during the blanking periods of moving image capturing and not to perform a power saving operation during still image capturing, as illustrated in FIG. 17. A moving image is continuously captured whereas a still image is instantaneously captured. Thus, even if a power saving operation is not performed during still image capturing, power saving can be achieved in the entire image sensor 106.

Figure 18A:
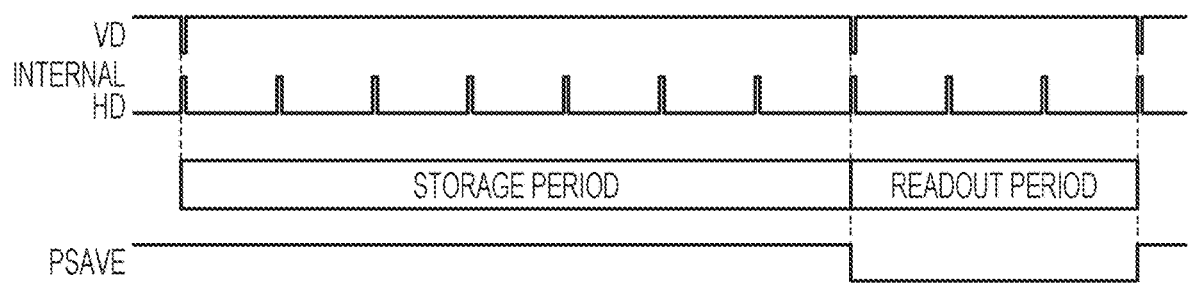
FIG. 18A is a timing chart illustrating a readout operation of the image sensor in the image capturing apparatus according to the fourth embodiment of the present invention.

In a storage period, as in a blanking period, neither signal readout nor AD conversion is performed. As illustrated in FIG. 18A, the image sensor 106 resets the pixel portions 11 and is then exposed during a predetermined storage period. After that, signals area read out during a readout period. The storage period is determined by a user or automatically on the basis of the brightness of a subject, and the period is specified by the signal VD or the internal HD. The image sensor 106 according to this embodiment is capable of setting a power saving operation also in the storage period.

Figure 18B:
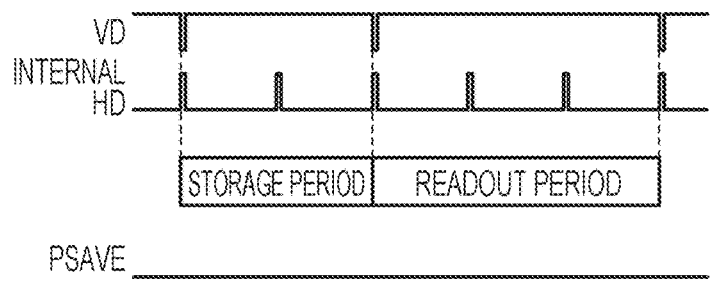
FIG. 18B is a timing chart illustrating a readout operation of the image sensor in the image capturing apparatus according to the fourth embodiment of the present invention.

In a case where the storage period is short (for example, about $1/1000$ seconds) as illustrated in FIG. 18B, the period for which a power saving operation can be set is short, and thus control is performed not to set a power saving operation in consideration of an influence of recovery from the power saving operation. As an example, it is preferable to set a power saving operation for a storage period in a case where the storage period is $1/8$ seconds to 1 second or more.

Fifth Embodiment

In the fourth embodiment, a description has been given of the timing to perform a power saving operation of the ADC circuit 805 in an image capturing operation in the image capturing apparatus 100 including the image sensor 106. In this embodiment, a detailed description will be given of an operation of performing a power saving operation by dividing a region in the circuit array of the image sensor 106.

Figure 19A:
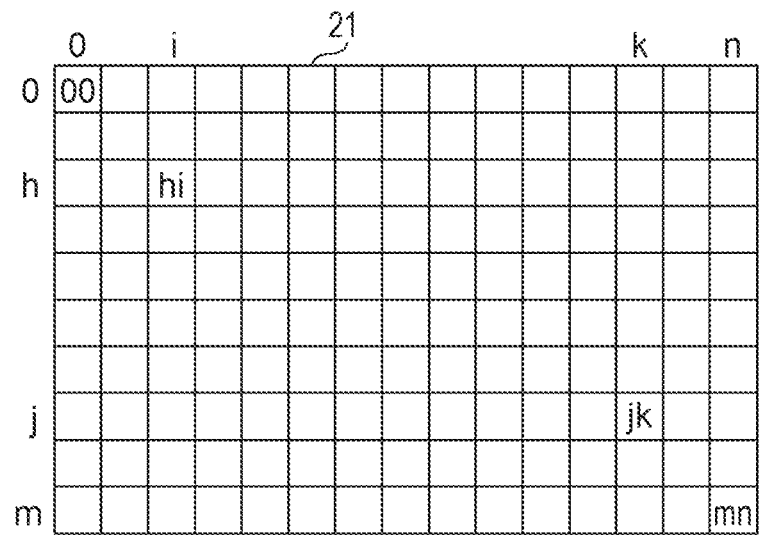
FIG. 19A is a schematic diagram illustrating an example of the configuration of an image sensor in an image capturing apparatus according to a fifth embodiment of the present invention.
Figure 19B:
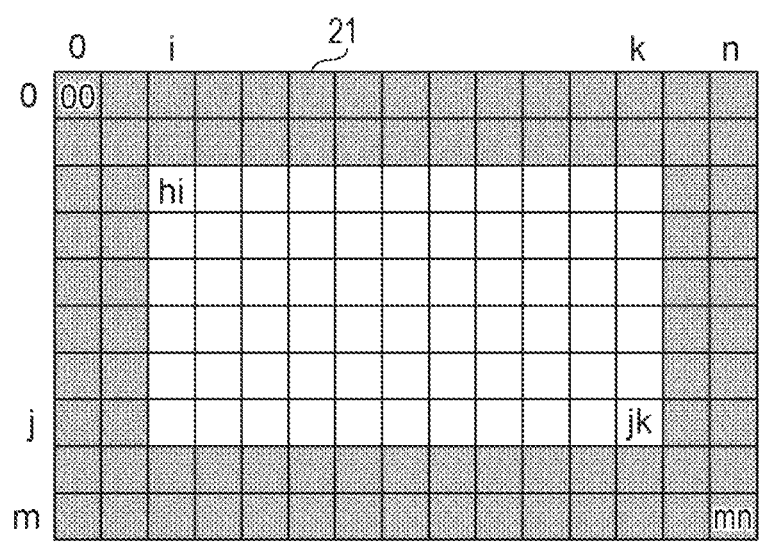
FIG. 19B is a schematic diagram illustrating an example of the configuration of the image sensor in the image capturing apparatus according to the fifth embodiment of the present invention.

FIG. 19A and FIG. 19B illustrate a circuit array formed in the second substrate 20 of the image sensor 106. Each element of the circuit array corresponds to the signal processing unit 21, and n×m signal processing units 21 are disposed in the horizontal and vertical directions. FIG. 19A illustrates a normal image capturing state, in which signals are read out by using the entire circuit array to obtain an image by using the entire screen. Thus, all the signal processing units 21 are set to perform a normal operation. On the other hand, FIG. 19B illustrates a clipped image capturing state (image capturing using only horizontal i-k columns and vertical h-j rows), in which an image is obtained by using only a central portion of the screen and not using the peripheral portion of the circuit array. Thus, the signal processing units 21 at the peripheral portion are set to perform a power saving operation in the clipped image capturing state.

A circuit configuration for performing a power saving operation in units of regions in this embodiment will be described with reference to FIGS. 20 and 21. FIG. 20 is a diagram illustrating the wiring layout of supply lines for a signal PSAVE. In this embodiment, the signal PSAVE is supplied to the individual signal processing units 21 through PSAVE_H(n) (n: column number) for horizontal control and PSAVE_V(m) (m: row number) for vertical control. PSAVE_H(n) and PSAVE_V(m) are connected by a driver circuit that is not illustrated and are controlled by a timing signal or the like from the TG 113.

A readout circuit for reading out signals from the individual pixel portions 11 in the image sensor 106 will be described with reference to FIG. 21. FIG. 21 illustrates an equivalent circuit about the readout circuit of the image sensor 106 according to the fifth embodiment. FIG. 21 corresponds to FIG. 8 in the first embodiment. The same components as those in FIG. 8 are denoted by the same reference numerals.

Figure 21:
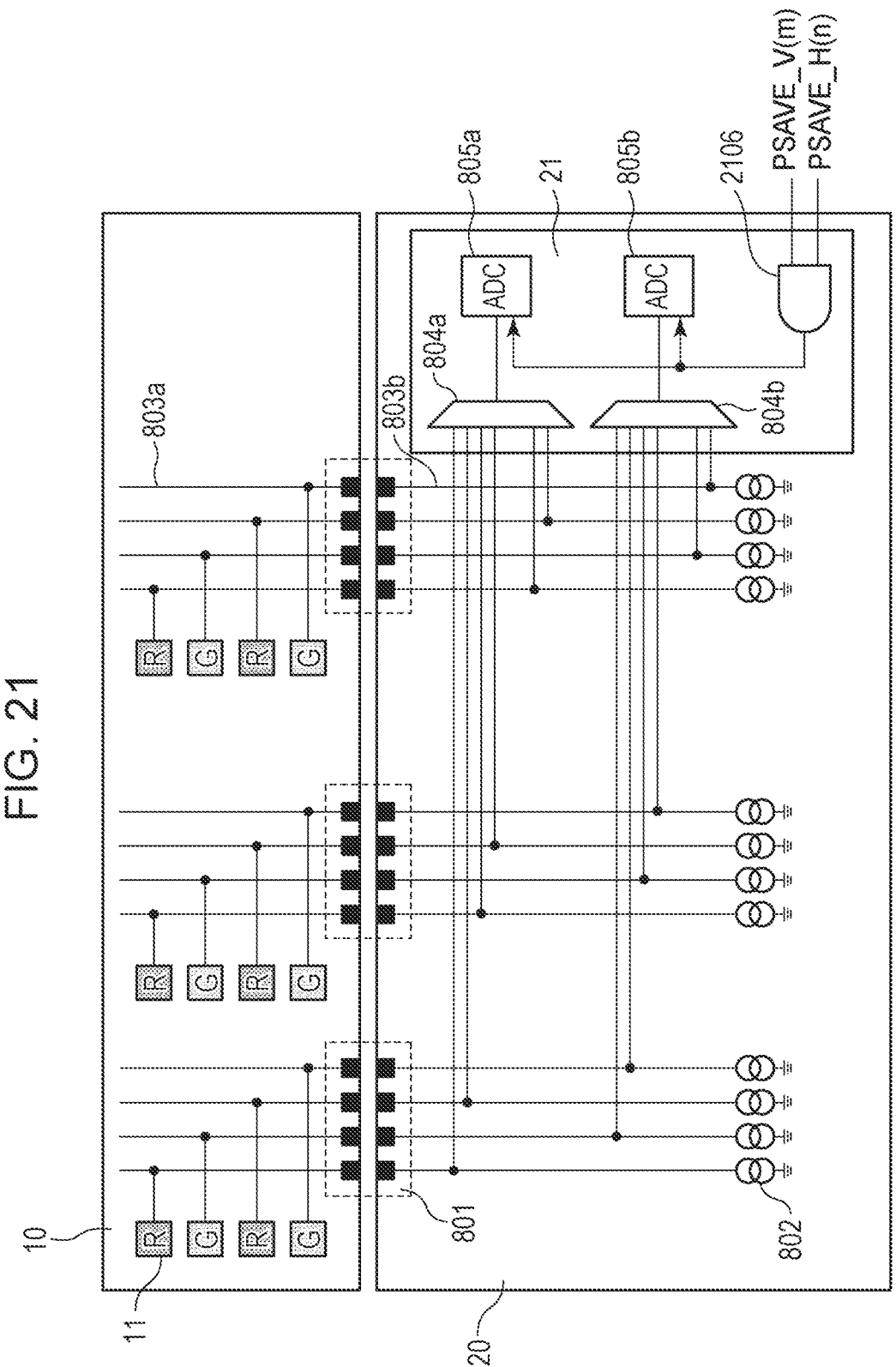
FIG. 21 is a diagram illustrating an example of the configuration of a common-to-column readout circuit of the image sensor in the image capturing apparatus according to the fifth embodiment of the present invention.

In FIG. 21, the signals output from the individual pixel portions 11 are read out through the signal lines 803. Each column of the pixel portions 11 has four signal lines 803. The circuit in FIG. 21 is different from the circuit according to the first embodiment in a PSAVE control unit 2106. PSAVE_H(n) and PSAVE_V(m) described using FIG. 20 are input to the PSAVE control unit 2106. The PSAVE control unit 2106 includes an AND circuit, and controls the ADC circuit 805 to perform a power saving operation when supplied with a high-level signal from either PSAVE_H(n) or PSAVE_V(m). By using PSAVE_H(n) and PSAVE_V(m) in this manner, any of the signal processing units 21 in the circuit array can be controlled to perform a power saving operation. To enable easier control of a power saving operation in a region within the circuit array, it is preferable to provide the signal processing unit 21 with a latch circuit that is not illustrated. This makes it possible to store, in the latch, that high-level signals have been supplied from both PSAVE_H(n) and PSAVE_V(m) and control of a power saving operation has been performed, and to maintain the state until the latch is reset. Accordingly, it is not necessary to constantly supply a high-level signal to PSAVE_H(n) and PSAVE_V(m) corresponding to the signal processing unit 21 to be controlled to perform a power saving operation, and a region can be selected with a higher degree of freedom. As an example, a power saving operation can be controlled in a plurality of regions in the pixel array. The number of wiring lines of PSAVE_H(n) or PSAVE_V(m) may be increased to control a power saving operation with a higher degree of freedom.

Sixth Embodiment

Figure 22:
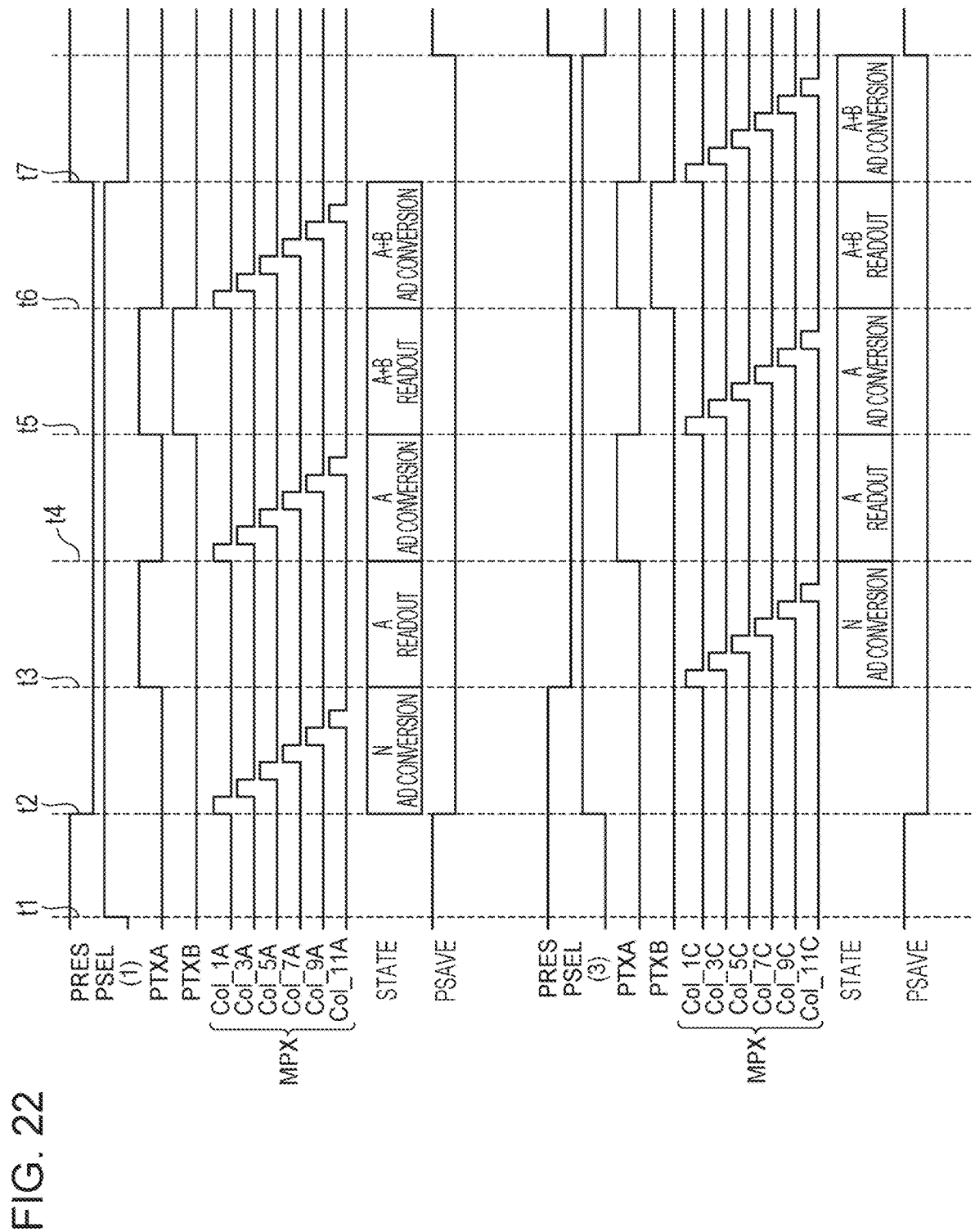
FIG. 22 is a timing chart illustrating a readout operation of an image sensor in an image capturing apparatus according to a sixth embodiment of the present invention.

FIG. 22 is a diagram illustrating a signal readout operation for focus detection in addition to a normal readout operation of the image sensor 106. In the operation in FIG. 22, signals are sequentially read out from the pixel portions 11 without adding the signals. In FIG. 22, a description will be given of the case of outputting signals for focus detection and signals for image capturing. That is, each pixel portion 11 outputs a first signal based on a signal of one of the plurality of PDs, and also outputs a second signal based on signals of the plurality of PDs. The signal lines illustrated in FIG. 22 are the same as those in FIG. 9. Furthermore, the description of an operation common to the operation according to the first embodiment will be omitted.

At time t3, the vertical scanning circuit causes only the signal PTXA to be output to the pixel portions 11 in the first row to be at a high level. Accordingly, the charge stored in the PD 401a is transferred to the FD portion 403 via the transfer transistor 402a. Accordingly, the potential of the FD portion 403 becomes a potential corresponding to the PD 401a. Subsequently, the amplification transistor 404 outputs an A signal on the basis of the potential of the FD portion 403 determined by only the charge of the PD 401a. The A signals of the pixel portions 11 in the first row are output to the signal lines 803 in the individual columns. Accordingly, the A signals corresponding to the pixel portions 11 in the odd columns among the first to twelfth columns are input to the MPX circuit 804a during the same period. In this embodiment, a period from time t3 corresponds to an A signal readout period.

At and after time t4, the MPX circuit 804a sequentially connects the signal lines 803 corresponding to the pixel portions 11 in the odd columns among the first to twelfth columns to the ADC circuit 805a in accordance with signals MPX supplied from the TG 113.

The ADC circuit 805a AD-converts the A signal of the signal line 803 in the first column corresponding to the pixel portion 11 in the first row, output from the MPX circuit 804a, into a digital signal. After that, the ADC circuit 805a sequentially AD-converts the A signals output to the signal lines 803 corresponding to the pixel portions 11 in the odd columns among the first to twelfth columns into digital signals. Because each A signal has already been input to the MPX circuit 804a, high-speed AD conversion can be performed only by switching an output of the MPX circuit 804a. In this embodiment, a period from time t4 corresponds to an A signal AD conversion period.

At time t4, the vertical scanning circuit causes only the signal PTXA to be output to the pixel portions 11 in the third row to be at a high level. Accordingly, the charge stored in the PD 401a is transferred to the FD portion 403 via the transfer transistor 402a. Accordingly, the potential of the FD portion 403 becomes a potential corresponding to the PD 401a. Subsequently, the amplification transistor 404 outputs an A signal on the basis of the potential of the FD portion 403 determined by only the charge of the PD 401a. The A signals of the pixel portions 11 in the third row are output to the signal lines 803 in the individual columns. Accordingly, the A signals corresponding to the pixel portions 11 in the odd columns among the first to twelfth columns are input to the MPX circuit 804a during the same period. In this embodiment, a period from time t4 corresponds to an A signal readout period.

At and after time t5, the MPX circuit 804a sequentially connects the signal lines 803 corresponding to the pixel portions 11 in the odd columns among the first to twelfth columns to the ADC circuit 805a in accordance with signals MPX supplied from the TG 113.

The ADC circuit 805a AD-converts the A signal of the signal line 803 in the first column corresponding to the pixel portion 11 in the third row, output from the MPX circuit 804a, into a digital signal. After that, the ADC circuit 805a sequentially AD-converts the A signals output to the signal lines 803 corresponding to the pixel portions 11 in the odd columns among the first to twelfth columns into digital signals. In this embodiment, a period from time t5 corresponds to an A signal AD conversion period.

At time t5, the vertical scanning circuit causes the signals PTXA and PTXB to be output to the pixel portions 11 in the first row to be at a high level. Accordingly, the charges (electrons in this embodiment) stored in the PDs 401a and 401b are transferred to the FD portion 403 via the transfer transistors 402a and 402b. The FD portion 403 adds the charges of the PDs 401a and 401b. Accordingly, the potential of the FD portion 403 becomes a potential corresponding to the charge obtained by adding the charges of the PDs 401a and 401b at time t5, in addition to the charge of the PD 401a transferred at time t3. The A+B signals of the pixel portions 11 in the first row have been output to the signal lines 803 in the individual columns. Accordingly, the A+B signals corresponding to the pixel portions 11 in the odd columns among the first to twelfth columns are input to the MPX circuit 804a during the same period. In this embodiment, a period from time t5 corresponds to an A+B signal readout period.

At and after time t6, the MPX circuit 804a sequentially connects the signal lines 803 corresponding to the pixel portions 11 in the odd columns among the first to twelfth columns to the ADC circuit 805a in accordance with signals MPX supplied from the TG 113.

The ADC circuit 805a AD-converts the A+B signal of the signal line 803 in the first column corresponding to the pixel portion 11 in the first row, output from the MPX circuit 804a, into a digital signal. After that, the ADC circuit 805a sequentially AD-converts the A+B signals output to the signal lines 803 corresponding to the pixel portions 11 in the odd columns among the first to twelfth columns into digital signals. In this embodiment, a period from time t6 corresponds to an A+B signal AD conversion period.

At time t6, the vertical scanning circuit causes the signals PTXA and PTXB to be output to the pixel portions 11 in the third row to be at a high level. Accordingly, the charges (electrons in this embodiment) stored in the PDs 401a and 401b are transferred to the FD portion 403 via the transfer transistors 402a and 402b. The FD portion 403 adds the charges of the PDs 401a and 401b. Accordingly, the potential of the FD portion 403 becomes a potential corresponding to the charge obtained by adding the charges of the PDs 401a and 401b at time t6, in addition to the charge of the PD 401a transferred at time t4. The A+B signals of the pixel portions 11 in the third row have been output to the signal lines 803 in the individual columns. Accordingly, the A+B signals corresponding to the pixel portions 11 in the odd columns among the first to twelfth columns are input to the MPX circuit 804a during the same period. In this embodiment, a period from time t6 corresponds to an A+B signal readout period.

At and after time t7, the MPX circuit 804a sequentially connects the signal lines 803 corresponding to the pixel portions 11 in the odd columns among the first to twelfth columns to the ADC circuit 805a in accordance with signals MPX supplied from the TG 113.

The ADC circuit 805a AD-converts the A+B signal of the signal line 803 in the first column corresponding to the pixel portion 11 in the third row, output from the MPX circuit 804a, into a digital signal. After that, the ADC circuit 805a sequentially AD-converts the A+B signals output to the signal lines 803 corresponding to the pixel portions 11 in the odd columns among the first to twelfth columns into digital signals. In this embodiment, a period from time t7 corresponds to an A+B signal AD conversion period.

As a result of reading out A signals before reading out A+B signals, both signals for focus detection and signals for an image can be read out. The B signal used for focus detection is calculated by reading out an A signal and an A+B signal and performing subtraction on both the signals.

Seventh Embodiment

In the first embodiment to the third embodiment, examples of the internal configuration of the image sensor 106 have been described. To read out signals from the pixel portions 11 at high speed, a plurality of circuits are arranged in parallel, and the individual circuits simultaneously perform readout operations. Meanwhile, an image sensor used in an image capturing apparatus represented by a single-lens reflex camera has a diagonal length of several centimeters. Thus, in-plane variation in a reference voltage level or the like inside the image sensor cannot be ignored. Also, varia-tion in output may occur among the circuits arranged in parallel, because of variation in manufacturing or asymmetry of wiring lengths of the circuits. In this embodiment, a method for correcting the variation will be described. It is assumed that the readout circuit according to the first embodiment illustrated in FIG. 8 is used as a readout circuit in the image sensor 106. Examples of correction include offset correction and gain correction. As a correction parameter, a value stored in the ROM 119 or the like in advance may be used, or a value generated in real time immediately before or after reading out a signal may be used.

Figure 23:
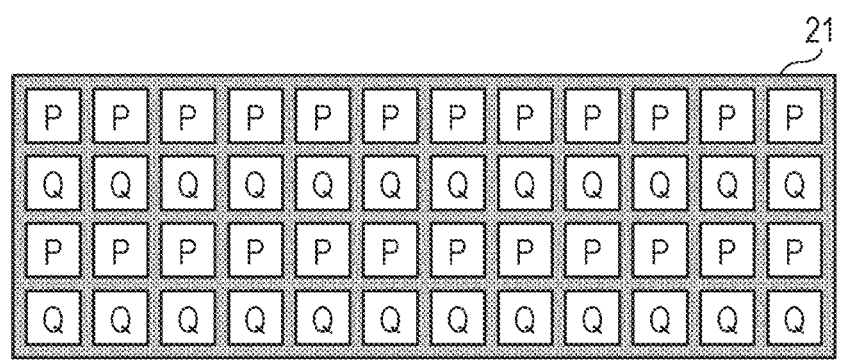
FIG. 23 illustrates an example of a pixel block according to a seventh embodiment of the present invention.

FIG. 23 illustrates one signal processing unit 21 and the pixel block 12 corresponding thereto. In the pixel block 12, as illustrated in FIG. 8, readout in the first and third rows in which the pixel portions 11 having R color filters are disposed and readout in the second and fourth rows in which the pixel portions 11 having G color filters are disposed are performed via different MPX circuits 804 and different ADC circuits 805. Thus, it is desired to perform correction by using a correction value for the first and third rows represented by "P" in FIG. 23 and another correction value for the second and fourth rows represented by "Q" in FIG. 23. This is because common circuit variations may occur in a periodical circuit. By periodically using the same correction value, the number of parameters to be used for correction can be reduced, and accordingly a processing load and power consumption can be reduced.

FIG. 24A and FIG. 24B illustrate a pixel array in the first substrate 10 and correction parameters corresponding thereto. As illustrated in FIG. 24A, the pixel array includes n×m pixel blocks 12 in the horizontal and vertical directions. The image sensor 106 according to this embodiment has a configuration in which the pixel blocks 12 adjacent to each other in the vertical direction have a common MPX circuit and a common ADC circuit. In this configuration, it is preferable that corresponding correction parameters be assigned to each unit formed of two pixel blocks 12 having the common circuit. FIG. 24B illustrates correction parameters corresponding to the individual units. One rectangle indicates one correction parameter. Each correction parameter includes correction parameters represented by P and Q for each row as described in FIG. 23.

Figure 25:
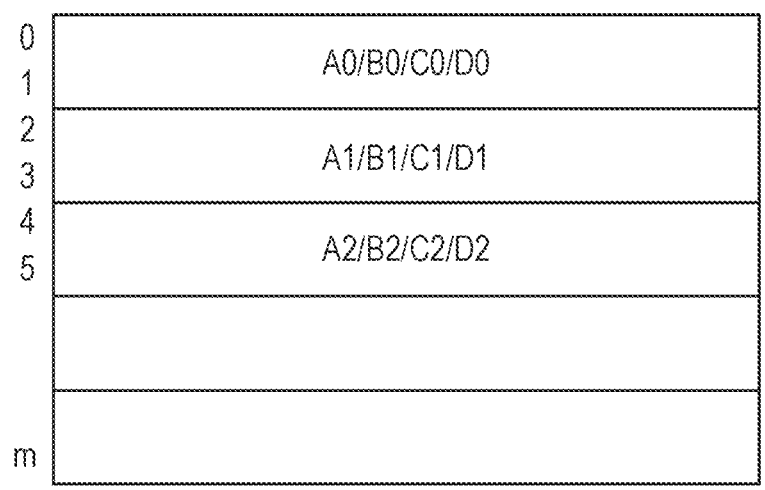
FIG. 25 is a configuration diagram of correction parameters according to the seventh embodiment of the present invention.

Although FIG. 23 illustrates an example in which different correction parameters are provided in units of rows, the correction parameters are not limited thereto. As illustrated in FIG. 8, each column is provided with a plurality of (four in FIG. 8) signal lines 803. Thus, it is effective to provide correction parameters corresponding to the individual signal lines 803. FIG. 25 illustrates correction parameters corresponding to four signal lines A to D. As described by using FIG. 24A and FIG. 24B, each unit having a common ADC circuit has a correction parameter, and parameters different in the vertical direction are provided as illustrated in FIG. 25.

A description has been given of an example of providing correction parameters in accordance with the cycle of circuits constituting the image sensor 106. The correction parameters may be stored in a functional form instead of storing them for each pixel block. In a case where the cycle of the circuits is changed by an addition-and-readout operation or the like, it is preferable to switch the correction parameter in accordance with an operation mode. Alternatively, the correction parameter may be changed in accordance with image capturing conditions, such as ISO speed and exposure time. Although an example of providing correction parameters in accordance with a circuit cycle and performing correction has been described in this embodiment, a plurality of correction operations may be individually performed in each circuit cycle.

Eighth Embodiment

Figure 26:
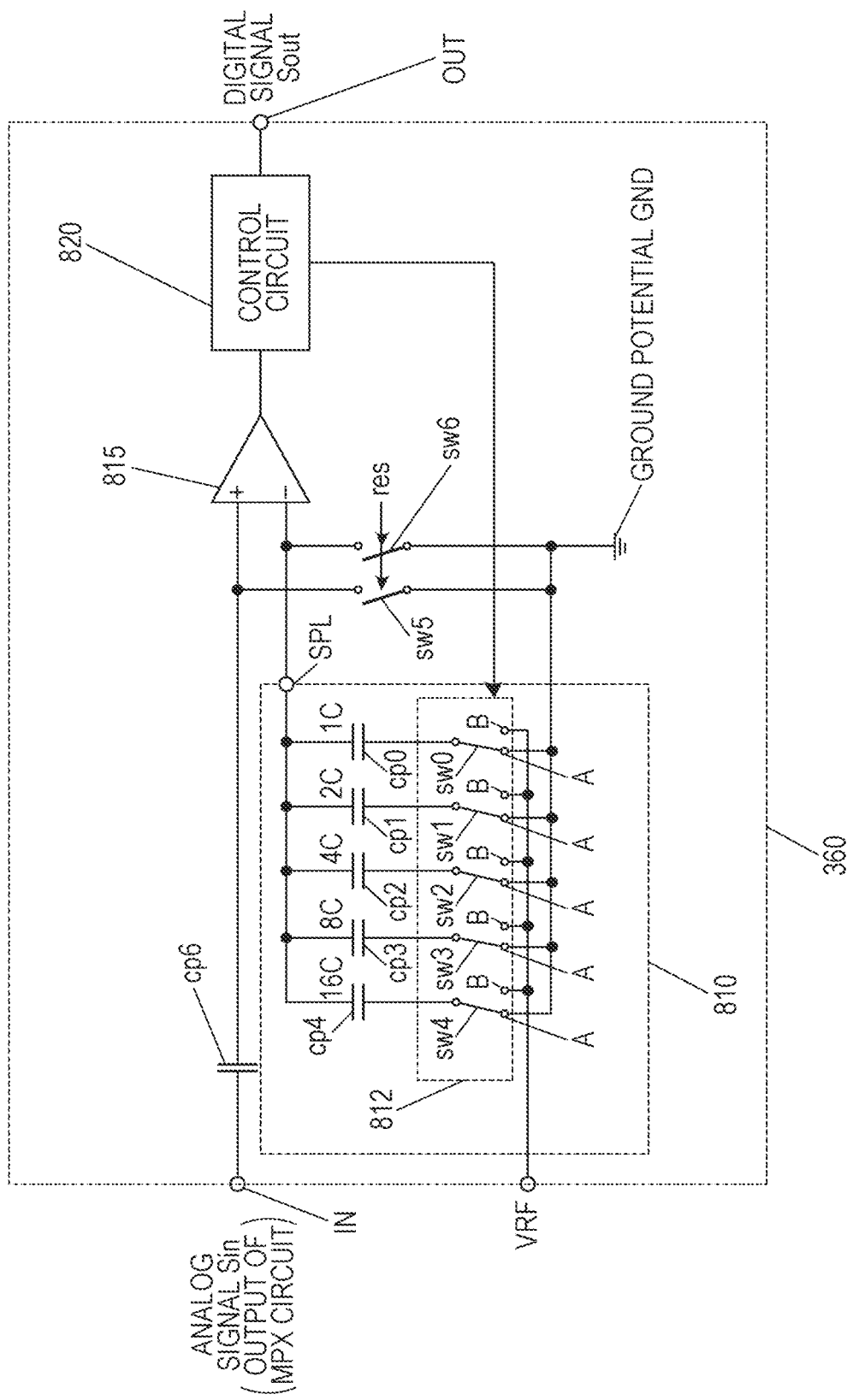
FIG. 26 is an internal configuration diagram of an ADC circuit according to an eighth embodiment of the present invention.

FIG. 26 is an equivalent circuit diagram of the ADC circuit 805 of the image sensor 106. The ADC circuit 805 includes an input terminal IN and an output terminal OUT, converts an analog signal Sin (an output of the MPX circuit 804) input from the input terminal IN into a digital signal Sout, and outputs the digital signal Sout from the output terminal OUT. The analog signal Sin may be one or both of the N signal and the A+B signal (S signal) described in the first embodiment. The ADC circuit 805 converts an output of the MPX circuit 804 into a digital signal Sout at a resolution of 5 bits.

The ADC circuit 805 further includes a generation circuit 810 that generates a comparison signal used for comparison with the analog signal Sin. The generation circuit 810 includes a plurality of capacitance elements cp0 to cp4 each having a capacitance value of a binary weight, and a plurality of switches sw0 to sw4 connected to the capacitance elements cp0 to cp4. The plurality of switches sw0 to sw4 constitute a switch circuit that selects one or more of the capacitance elements cp0 to cp4. The binary weight is a set of weights (capacitance values) forming a geometric progression of a common ratio of 2. In the example in FIG. 26, the capacitance elements cp0 to cp4 have capacitance values 1 C, 2 C, 4 C, 8 C, and 16 C, respectively. One electrodes of the capacitance elements cp0 to cp4 are connected to a supply terminal SPL of the generation circuit 810, and the other electrodes thereof are connected to the switches sw0 to sw4, respectively. One ends of the switches sw0 to sw4 are connected to the capacitance elements cp0 to cp4, respectively, and the other ends thereof toggle between a terminal A and a terminal B. The terminal A is supplied with a ground potential GND, and the terminal B is supplied with a reference voltage VRF. The reference voltage VRF is a constant voltage supplied from the outside of the ADC circuit 805 and has a value larger than the ground potential GND. When the switch sw0 toggles to the terminal A, the ground potential GND is supplied to the capacitance element cp0. When the switch sw0 toggles to the terminal B, the reference voltage VRF is supplied to the capacitance element cp0. The same applies to the other switches sw1 to sw4. Switching of the switches sw0 to sw4 changes a combined capacitance value of the capacitance elements connected between the supply terminal SPL and the reference voltage VRF, and as a result, the value of a comparison signal Vcmp output from the supply terminal SPL is changed.

Furthermore, the supply terminal SPL of the generation circuit 810 is supplied with a ramp signal Vrmp from the outside of the ADC circuit 805 via a capacitance element cp5. The capacitance element cp5 is a capacitance element for adjusting the magnitude of the ramp signal Vrmp and has a capacitance value of 1 C. That is, the capacitance value of the capacitance element cp5 is equal to the smallest capacitance value among the capacitance values of the capacitance elements cp0 to cp4 each having a capacitance value of a binary weight. A change in the value of the ramp signal Vrmp causes a change in the value of the comparison signal Vcmp output from the supply terminal SPL.

By combining a set of the capacitance elements connected between the supply terminal SPL and the reference voltage VRF and the value of the ramp signal Vrmp, the comparison signal Vcmp may have a certain value that is larger than or equal to the ground potential GND and smaller than or equal to the reference voltage VRF.

The ADC circuit 805 further includes a comparator 815. The comparator 815 compares the value of the analog signal Sin with the value of the comparison signal Vcmp and outputs a signal corresponding to a comparison result. The comparator 815 has a noninverting terminal supplied with the analog signal Sin via a capacitance element cp6, and has an inverting terminal supplied with the comparison signal Vcmp from the supply terminal SPL of the generation circuit 810. Accordingly, a high level is output in a case where the value of the analog signal Sin is larger than or equal to the value of the comparison signal Vcmp, and a low level is output in a case where the value of the analog signal Sin is smaller than the comparison signal Vcmp. In this example, a high level is output in a case where the value of the analog signal Sin is equal to the value of the comparison signal Vcmp. Alternatively, a low level may be output in this case. The capacitance element cp6 adjusts the value of the analog signal Sin to a range comparable with the comparison signal Vcmp. In this embodiment, to simplify the description, it is assumed that the value of the analog signal Sin is larger than or equal to the ground potential GND and is smaller than or equal to the reference voltage VRF, and that a signal having the same magnitude as the analog signal Sin is supplied to the noninverting terminal of the comparator 815.

In the example in FIG. 26, the analog signal Sin is supplied to the noninverting terminal of the comparator 815, and the comparison signal Vcmp is supplied to the inverting terminal of the comparator 815. As long as it is possible to determine which of the value of the analog signal Sin and the value of the comparison signal Vcmp is larger, another configuration may be adopted. For example, a difference between the analog signal Sin and the comparison signal Vcmp may be supplied to the noninverting terminal of the comparator 815, and the ground potential GND may be supplied to the inverting terminal of the comparator 815.

The ADC circuit 805 further includes switches sw5 and sw6. When these switches sw5 and sw6 are turned ON, the ground potential GND is supplied to the noninverting terminal and the inverting terminal of the comparator 815, and the comparator 815 is reset.

The ADC circuit 805 further includes a control circuit 820. The control circuit 820 is supplied with a comparison result from the comparator 815, generates a digital signal Sout on the basis of the comparison result, and outputs the digital signal Sout from the output terminal OUT. In addition, the control circuit 820 transmits control signals to the individual switches sw0 to sw6 to change the states thereof.

Figure 27:
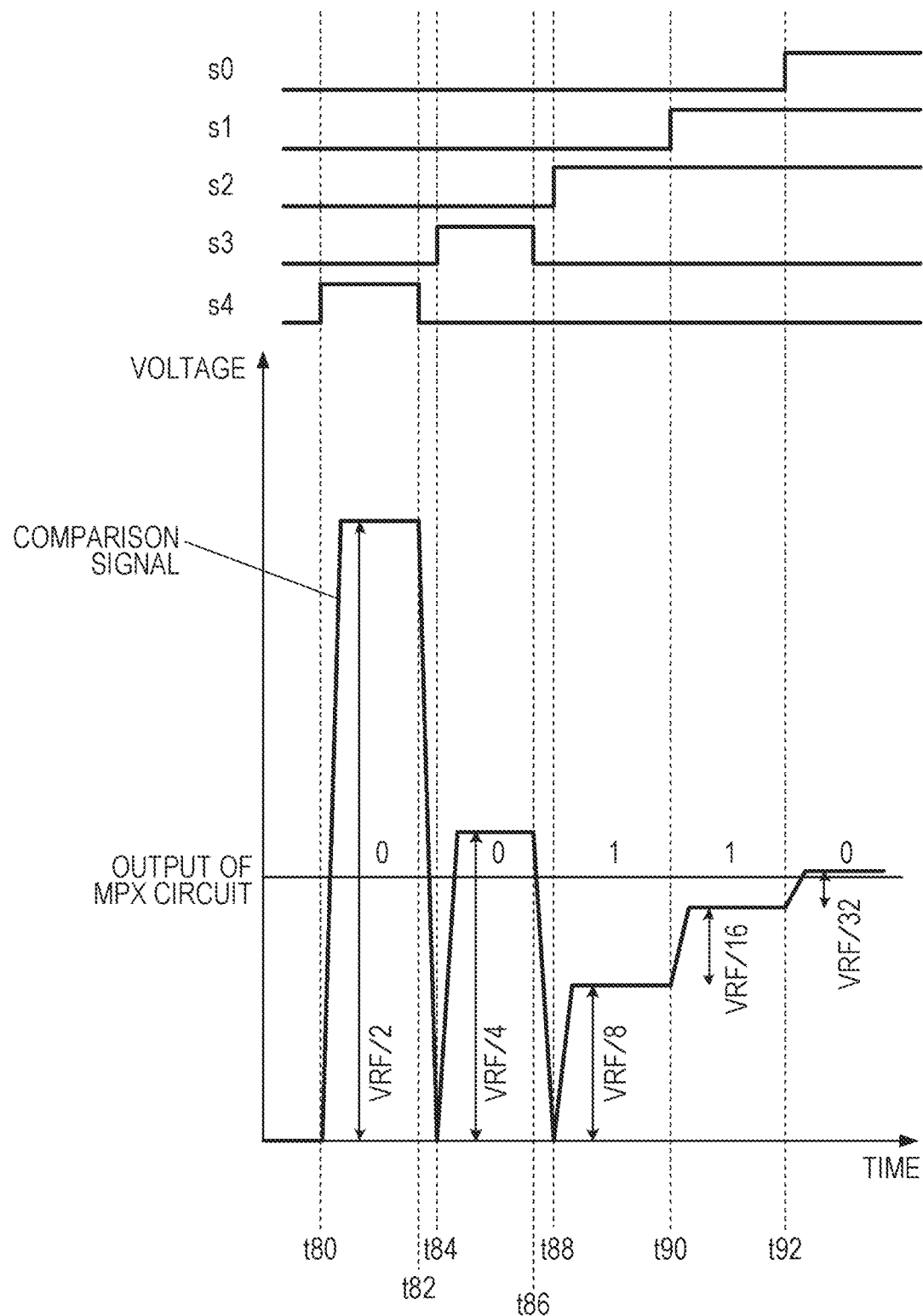
FIG. 27 is a timing chart illustrating an operation of the ADC circuit according to the eighth embodiment of the present invention.

In FIG. 27, sw0 to sw6 represent the values of the control signals supplied from the control circuit 820 to the switches sw0 to sw6. Each of the switches sw0 to sw4 toggles to the terminal B when the control signal supplied thereto is at a high level and toggles to the terminal A when the control signal is at a low level. The switches sw5 and sw6 are turned ON when the control signal supplied thereto is at a high level and are turned OFF when the control signal is at a low level. On the lower side of FIG. 27, the analog signal Sin and the comparison signal Vcmp are illustrated. In FIG. 27, for example, it is assumed that the value of the analog signal Sin corresponds to 00110 in a binary number.

Next, an AD conversion operation by the ADC circuit 805 will be described in time sequence. In a preparatory period, the control circuit 820 causes the control signals to be supplied to the switches sw0 to sw4 to be at a low level, and causes the control signals to be supplied to the switches sw5 and sw6 to be at a high level. Accordingly, the noninverting terminal and the inverting terminal of the comparator 815 are reset to the ground potential GND, and the value of the comparison signal Vcmp becomes equal to the ground potential GND. After that, the control circuit 820 causes the control signals to be supplied to the switches sw5 and sw6 to be at a low level. In the operation performed thereafter, the noninverting terminal of the comparator 815 is continuously supplied with the analog signal Sin.

Subsequently, when a successive approximation period starts, the control circuit 820 changes the control signal to be supplied to the switch sw4 to a high level. Accordingly, the switch sw4 toggles to the terminal B, and the reference voltage VRF is applied to the supply terminal SPL of the generation circuit 810 via the capacitor cp4 having the largest capacitance value in the binary weight. As a result, the comparison signal Vcmp increases by VRF/2, and the value of the comparison signal Vcmp becomes equal to VRF/2. The control circuit 820 determines that the value of the analog signal Sin is smaller than the value of the comparison signal Vcmp (VRF/2) on the basis of a comparison result from the comparator 815, and changes the control signal to be supplied to the switch sw4 to a low level. Accordingly, the value of the comparison signal Vcmp is changed to the ground potential GND. This comparison result indicates that the MSB (the fifth bit in a case where the LSB is the first bit) of the value of the digital signal Sout is 0.

Next, the control circuit 820 changes the control signal to be supplied to the switch sw3 to a high level. Accordingly, the reference voltage VRF is applied to the supply terminal SPL of the generation circuit 810 via the capacitor cp3 having the second largest capacitance value in the binary weight. As a result, the comparison signal Vcmp increases by VRF/4, and the value of the comparison signal Vcmp becomes equal to VRF/4. The control circuit 820 determines that the value of the analog signal Sin is smaller than the value of the comparison signal Vcmp (VRF/4) on the basis of a comparison result from the comparator 815, and changes the control signal to be supplied to the switch sw3 to a low level. Accordingly, the value of the comparison signal Vcmp is changed to the ground potential GND. This comparison result indicates that the fourth bit of the value of the digital signal Sout is 0.

Next, the control circuit 820 changes the control signal to be supplied to the switch sw2 to a high level. Accordingly, the reference voltage VRF is applied to the supply terminal SPL of the generation circuit 810 via the capacitor cp2 having the third largest capacitance value in the binary weight. As a result, the comparison signal Vcmp increases by VRF/8, and the value of the comparison signal Vcmp becomes equal to VRF/8. The control circuit 820 determines that the value of the analog signal Sin is larger than the value of the comparison signal Vcmp (VRF/8) on the basis of a comparison result from the comparator 815, and keeps the control signal to be supplied to the switch sw2 at a high level. Accordingly, the value of the comparison signal Vcmp is kept at VRF/8. This comparison result indicates that the third bit of the value of the digital signal Sout is 1.

Next, the control circuit 820 changes the control signal to be supplied to the switch sw1 to a high level. Accordingly, the reference voltage VRF is applied to the supply terminal SPL of the generation circuit 810 via the capacitor cp1 having the fourth largest capacitance value in the binary weight and the capacitor cp2. As a result, the comparison signal Vcmp increases by VRF/16, and the value of the comparison signal Vcmp becomes equal to VRF*3/16. In this specification, "*" represents multiplication. The control circuit 820 determines that the value of the analog signal Sin is larger than the value of the comparison signal Vcmp (VRF*3/16) on the basis of a comparison result from the comparator 815, and keeps the control signal to be supplied to the switch sw1 at a high level. Accordingly, the value of the comparison signal Vcmp is kept at VRF*3/16. This comparison result indicates that the second bit of the value of the digital signal Sout is 1.

Finally, the control circuit 820 changes the control signal to be supplied to the switch sw0 to a high level. Accordingly, the reference voltage VRF is applied to the supply terminal SPL of the generation circuit 810 via the capacitor cp0 having the fifth largest capacitance value in the binary weight, and the capacitors cp1 and cp2. As a result, the comparison signal Vcmp increases by VRF/32, and the value of the comparison signal Vcmp becomes equal to VRF*7/32. The control circuit 820 determines that the value of the analog signal Sin is smaller than the value of the comparison signal Vcmp (VRF*7/32) on the basis of a comparison result from the comparator 815, and changes the control signal to be supplied to the switch sw0 to a low level. Accordingly, the value of the comparison signal Vcmp is changed to VRF*3/16. This comparison result indicates that the first bit of the value of the digital signal Sout is 0.

As a result of the foregoing successive approximation, the control circuit 820 determines that the digital signal Sout corresponding to the analog signal is 00110.

In this way, the ADC circuit 805 is capable of performing AD conversion for generating a digital signal corresponding to an analog signal input thereto.

A description has been given of an example of using a successive approximation ADC circuit as another AD conversion method. The ADC circuit 805 is not limited to this successive approximation ADC circuit. For example, ADC circuits of other types including a ramp signal comparison type, a delta-sigma type, a pipeline type, a flash type, and the like may be used.

Ninth Embodiment

The image sensor 106 and the image capturing apparatus 100 described in each embodiment are applicable to various applications. For example, the image sensor 106 can be used for sensing light other than visible light, such as infrared light, ultraviolet light, or X rays. The image capturing apparatus 100 is represented by a digital camera, and is also applicable to a mobile phone equipped with a camera such as a smartphone, a monitoring camera, a game machine, or the like. Furthermore, the image capturing apparatus 100 is applicable to an endoscope or medical equipment for capturing an image of blood vessels, beauty equipment for observing skin or scalp, or a video camera for capturing a moving image of sports or actions. Also, the image capturing apparatus 100 is applicable to a traffic-purpose camera such as a camera for monitoring traffic or ships or a drive recorder, an academic-purpose camera for observing celestial objects or specimens, a home appliance equipped with a camera, a machine vision system, or the like. In particular, application to a machine vision system is not limited to a robot in a factory or the like, and application to agriculture or fisheries is possible.

The configuration of the image capturing apparatus according to the above embodiments is merely an example, and the configuration of the image capturing apparatus to which the present invention is applicable is not limited to the configuration illustrated in FIG. 1. In addition, the circuit configurations of individual units of the image capturing apparatus are not limited to those illustrated in the figures.

The present invention can be implemented by supplying a program for executing one or more functions of the above-described embodiments to a system or apparatus via a network or storage medium and by reading and executing the program by one or more processors in a computer of the system or apparatus. Alternatively, the present invention can be implemented by a circuit executing one of more functions (for example, ASIC).

According to the present invention, it is possible to provide an image capturing apparatus that is capable of realizing power saving of the image sensor while suppressing a decrease in frame rate caused by an increase in the amount of data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
an image sensor including a first substrate and a second substrate that are stacked one on top of another, the first substrate having a pixel array in which pixel blocks each including a plurality of pixels for performing photoelectric conversion are disposed in matrix, the second substrate having a circuit array in which a plurality of signal processing units that process signals based on the photoelectric conversion are disposed in matrix;
obtaining means for obtaining an image signal from the image sensor; and
driving control means for controlling driving for obtaining the image signal from the image sensor, wherein each of the signal processing units includes a conversion circuit that performs analog-to-digital conversion on the signals input from a corresponding one of the pixel blocks through a plurality of signal lines during an identical period,
the driving control means controls a power saving operation of at least one or some of the signal processing units during a period over which analog-to-digital conversion is not performed in the signal processing units, and
each of the signal processing units further includes a selecting unit that selects a signal line to be connected to the conversion circuit from among the plurality of signal lines.

2. The image capturing apparatus according to claim 1, wherein the driving control means controls a power saving operation of the conversion circuit for analog-to-digital conversion in the signal processing unit.

3. The image capturing apparatus according to claim 1, wherein each of the pixel blocks is connected to a corresponding one of the signal processing units through at least four or more signal lines that are connected to a plurality of pixels included in the pixel block.

4. The image capturing apparatus according to claim 1, wherein the image sensor further includes a control unit for controlling a power saving operation of at least one or some of the signal processing units based on control by the driving control means.

5. The image capturing apparatus according to claim 1, wherein the period over which analog-to-digital conversion is not performed includes a blanking period.

6. The image capturing apparatus according to claim 5, wherein the driving control means controls the power saving operation based on a length of the blanking period.

7. The image capturing apparatus according to claim 1, wherein the period over which analog-to-digital conversion is not performed includes a storage period.

8. The image capturing apparatus according to claim 7, wherein the driving control means controls the power saving operation based on a length of the storage period.

9. The image capturing apparatus according to claim 8, wherein the driving control means controls the power saving operation in a case where the storage period is ⅛ seconds or more.

10. The image capturing apparatus according to claim 1, wherein the driving control means has a plurality of wiring lines disposed in a horizontal direction and a vertical direction, and controls a power saving operation of one or more of the signal processing units included in a predetermined partial region of the image sensor by using the plurality of wiring lines.

11. An image capturing apparatus comprising:
an image sensor including a first substrate and a second substrate that are stacked one on top of another, the first substrate having a pixel array in which pixel blocks each including a plurality of pixels for performing photoelectric conversion are disposed in matrix, the second substrate having a circuit array in which a plurality of signal processing units that process signals based on the photoelectric conversion are disposed in matrix, wherein each of the pixels includes a plurality of photoelectric conversion units for generating a parallax image;
obtaining means for obtaining an image signal from the image sensor;
driving control means for controlling driving for obtaining the image signal from the image sensor; and
focus detection means for performing focus detection based on the parallax image, wherein
each of the signal processing units includes a conversion circuit that performs analog-to-digital conversion on the signals input from a corresponding one of the pixel blocks through a plurality of signal lines during an identical period, and
the driving control means controls a power saving operation of at least one or some of the signal processing units during a period over which analog-to-digital conversion is not performed in the signal processing units.

12. The image capturing apparatus according to claim 11, wherein the driving control means controls a power saving operation of the conversion circuit for analog-to-digital conversion in the signal processing unit.

13. The image capturing apparatus according to claim 11, wherein each of the pixel blocks is connected to a corresponding one of the signal processing units through at least four or more signal lines that are connected to a plurality of pixels included in the pixel block.

14. The image capturing apparatus according to claim 11, wherein the image sensor further includes a control unit for controlling a power saving operation of at least one or some of the signal processing units based on control by the driving control means.

15. The image capturing apparatus according to claim 11, wherein the period over which analog-to-digital conversion is not performed includes a blanking period.

16. The image capturing apparatus according to claim 15, wherein the driving control means controls the power saving operation based on a length of the blanking period.

17. The image capturing apparatus according to claim 11, wherein the period over which analog-to-digital conversion is not performed includes a storage period.

18. The image capturing apparatus according to claim 17, wherein the driving control means controls the power saving operation based on a length of the storage period.

19. The image capturing apparatus according to claim 18, wherein the driving control means controls the power saving operation in a case where the storage period is ⅛ seconds or more.

20. The image capturing apparatus according to claim 11, wherein the driving control means has a plurality of wiring lines disposed in a horizontal direction and a vertical direction, and controls a power saving operation of one or more of the signal processing units included in a predetermined partial region of the image sensor by using the plurality of wiring lines.

21. A method for controlling an image capturing apparatus including an image sensor including a first substrate and a second substrate that are stacked one on top of another, the first substrate having a pixel array in which pixel blocks each including a plurality of pixels for performing photoelectric conversion are disposed in matrix, the second substrate having a circuit array in which a plurality of signal processing units that process signals based on the photoelectric conversion are disposed in matrix, the method comprising:
obtaining an image signal from the image sensor;
controlling driving for obtaining the image signal from the image sensor,
generating a parallax image; and
performing focus detection based on the parallax image, wherein
each of the signal processing units includes a conversion circuit that performs analog-to-digital conversion on the signals input from a corresponding one of the pixel blocks through a plurality of signal lines during an identical period, and
the controlling driving controls a power saving operation of at least one or some of the signal processing units at a timing when analog-to-digital conversion is not performed in the signal processing units.

22. The method according to claim 12, wherein the controlling driving controls a power saving operation of the conversion circuit for analog-to-digital conversion in the signal processing unit.

23. The method according to claim 12, wherein each of the pixel blocks is connected to a corresponding one of the signal processing units through at least four or more signal lines that are connected to a plurality of pixels included in the pixel block.

24. The method according to claim 12, further comprising selecting a signal line to be connected to the conversion circuit from among the plurality of signal lines.

25. The method according to claim 12, further comprising controlling a power saving operation of at least one or some of the signal processing units based on the controlling driving.

26. The method according to claim 12, wherein the period over which analog-to-digital conversion is not performed includes a blanking period.

27. The method according to claim 12, wherein the period over which analog-to-digital conversion is not performed includes a storage period.

28. An image sensor comprising:
a pixel array in which pixel blocks each including a plurality of pixels for performing photoelectric conversion are disposed in matrix;
a circuit array in which a plurality of signal processors that process signals based on the photoelectric conversion are disposed in matrix, wherein each of the signal processors includes a conversion circuit that performs analog-to-digital conversion on the signals input from a corresponding one of the pixel blocks through a plurality of signal lines during an identical period, and a selector that selects a signal line to be connected to the conversion circuit from among the plurality of signal lines; and
a controller for controlling a power saving operation of at least one or some of the signal processors during a period over which analog-to-digital conversion is not performed in the signal processors,
wherein the pixel array is arranged on a first substrate and the circuit array is arranged on a second substrate, and the first substrate and the second substrate are stacked one on top of another.

29. The image sensor according to claim 28, wherein the controller controls a power saving operation of the conversion circuit for the analog-to-digital conversion in the signal processors.

30. The image sensor according to claim 28, wherein each of the pixel blocks is connected to a corresponding one of the signal processors through at least four or more signal lines that are connected to a plurality of pixels included in the pixel block.

31. The image sensor according to claim 28, wherein the period over which the analog-to-digital conversion is not performed includes a blanking period.

32. The image sensor according to claim 31, wherein the controller controls the power saving operation based on a length of the blanking period.

33. The image sensor according to claim 28, wherein the period over which the analog-to-digital conversion is not performed includes a storage period.

34. The image sensor according to claim 33, wherein the controller controls the power saving operation based on a length of the storage period.

35. The image sensor according to claim 34, wherein the controller controls the power saving operation in a case where the storage period is 1/8 seconds or more.

36. The image sensor according to claim 28, wherein the controller has a plurality of wiring lines disposed in a horizontal direction and a vertical direction, and controls a power saving operation of one or more of the signal processors included in a predetermined partial region of the image sensor by using the plurality of wiring lines.

37. An image sensor comprising:
a pixel array in which pixel blocks each including a plurality of pixels for performing photoelectric conversion are disposed in matrix, wherein each of the plurality of pixels includes a plurality of photoelectric convertors;
a circuit array in which a plurality of signal processors that process signals based on the photoelectric conversion are disposed in matrix, wherein each of the plurality of signal processors includes a conversion circuit that performs analog-to-digital conversion on the signals input from a corresponding one of the pixel blocks through a plurality of signal lines during an identical period; and
a controller for controlling a power saving operation of at least one or some of the signal processors during a period over which analog-to-digital conversion is not performed in the signal processors, wherein the pixel array is arranged on a first substrate and the circuit array is arranged on a second substrate, and the first substrate and the second substrate are stacked one on top of another.

38. The image sensor according to claim 37, wherein the controller controls a power saving operation of the conversion circuit for the analog-to-digital conversion in the signal processors.

39. The image sensor according to claim 37, wherein each of the pixel blocks is connected to a corresponding one of the signal processors through at least four or more signal lines that are connected to a plurality of pixels included in the pixel block.

40. The image sensor according to claim 37, wherein the period over which the analog-to-digital conversion is not performed includes a blanking period.

41. The image sensor according to claim 40, wherein the controller controls the power saving operation based on a length of the blanking period.

42. The image sensor according to claim 37, wherein the period over which analog-to-digital conversion is not performed includes a storage period.

43. The image sensor according to claim 42, wherein the controller controls the power saving operation based on a length of the storage period.

44. The image sensor according to claim 43, wherein the controller controls the power saving operation in a case where the storage period is 1/8 seconds or more.

45. The image sensor according to claim 37, wherein the controller has a plurality of wiring lines disposed in a horizontal direction and a vertical direction, and controls a power saving operation of one or more of the signal processors included in a predetermined partial region of the image sensor by using the plurality of wiring lines.

\* \* \* \* \*